United States Patent
Kotikalapoodi

(10) Patent No.: US 10,727,738 B2
(45) Date of Patent: Jul. 28, 2020

(54) METHOD AND APPARATUS FOR CONTROL OF SWITCH MODE POWER SUPPLIES UTILIZING MAGNETIC AND CAPACITIVE CONVERSION MEANS

(71) Applicant: Sridhar V. Kotikalapoodi, Sunnyvale, CA (US)

(72) Inventor: Sridhar V. Kotikalapoodi, Sunnyvale, CA (US)

( * ) Notice: Subject to any disclaimer, the term of this patent is extended or adjusted under 35 U.S.C. 154(b) by 0 days.

(21) Appl. No.: 16/104,634

(22) Filed: Aug. 17, 2018

(65) Prior Publication Data

US 2018/0367033 A1 Dec. 20, 2018

Related U.S. Application Data

(63) Continuation-in-part of application No. 14/693,746, filed on Apr. 22, 2015, now Pat. No. 10,084,384.

(51) Int. Cl.
*H02M 3/07* (2006.01)

(52) U.S. Cl.
CPC ........ *H02M 3/07* (2013.01); *H02M 2003/072* (2013.01)

(58) Field of Classification Search
CPC .... H02M 3/07–2003/078; G05F 3/205; G11C 5/145; H01L 27/0222
See application file for complete search history.

(56) References Cited

U.S. PATENT DOCUMENTS

| | | | | |
|---|---|---|---|---|
| 5,581,454 A | * | 12/1996 | Collins | H02M 3/07 363/59 |
| 6,184,741 B1 | * | 2/2001 | Ghilardelli | G11C 5/145 327/536 |
| 6,414,453 B1 | * | 7/2002 | Tamagawa | B60K 6/28 318/139 |
| 8,854,019 B1 | | 10/2014 | Levesque | |
| 10,069,408 B2 | * | 9/2018 | Abdulslam | H02M 3/07 |
| 2008/0158915 A1 | | 7/2008 | Williams | |
| 2009/0278520 A1 | | 11/2009 | Perreault | |
| 2015/0194878 A1 | * | 7/2015 | Hu | H02M 3/07 365/226 |
| 2016/0065058 A1 | * | 3/2016 | Van Kampen | B81B 7/008 327/536 |
| 2016/0352219 A1 | | 12/2016 | Amgad Abdulslam | |

* cited by examiner

*Primary Examiner* — Daniel Kessie
*Assistant Examiner* — Peter M Novak
(74) *Attorney, Agent, or Firm* — Heimlich Law, PC; Alan Heimlich, Esq.

(57) ABSTRACT

A Method and apparatus for control of switch mode power supplies utilizing magnetic and capacitive conversion means are disclosed. The switch mode power supply is efficient and generates very small inductor current ripple and output voltage ripple. The switch mode power supply has a wider bandwidth and the filter components including magnetic storage element and the output capacitor can be made much smaller. The capacitor voltages in the switched capacitor array are regulated by changing the amount of time the inductor current passes through them.

15 Claims, 15 Drawing Sheets

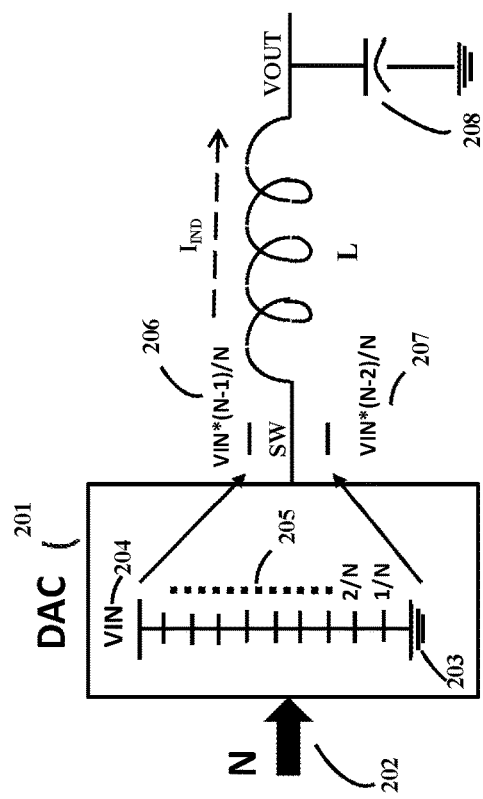
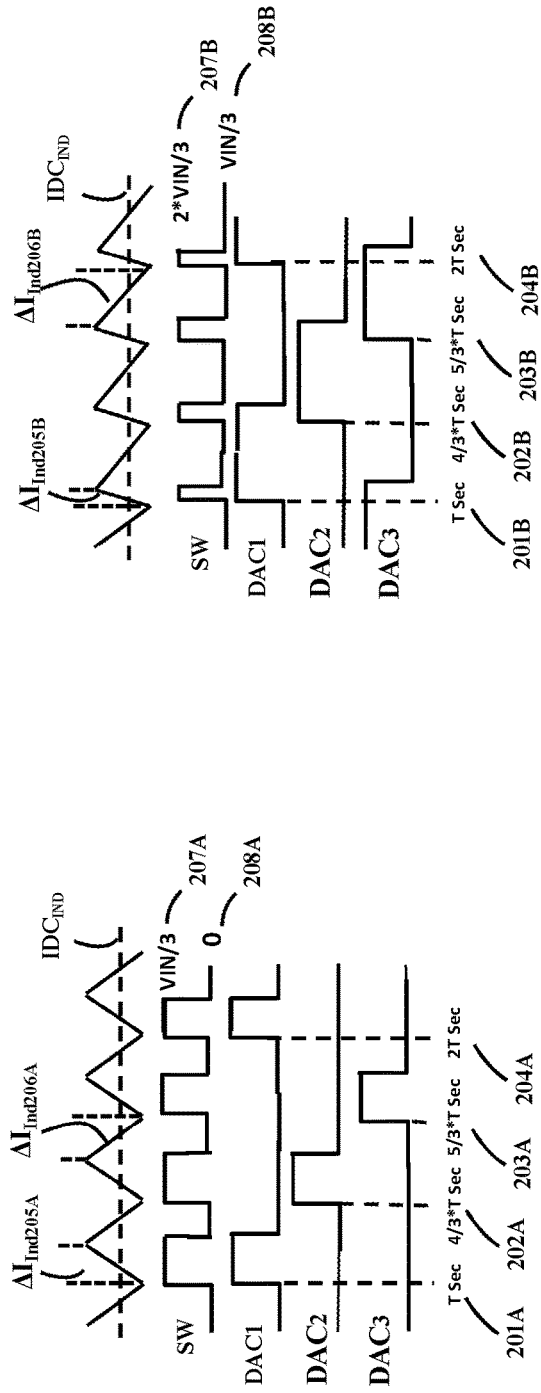
Figure 2
Figure 2A
Figure 2B

400B

| Phases ON | Switches Closed | Capacitor State | Voltage on SW Node |
|---|---|---|---|
| None | S1B, S2B, S3B | Hold | Zero |
| Phi 1 | S1,S2B,S3B | C1- Charge<br>C2 - Hold | VIN/3 |
| Phi 2 | S2,S1B,S3B | C1-Discharge<br>C2-Charge | VIN/3 |
| Phi 3 | S3, S1B,S2B | C1-Hold<br>C2-Discharge | VIN/3 |
| Phi1, Phi2 | S1,S2,S3B | C1-Hold<br>C2-Charge | 2VIN/3 |
| Phi2, Phi3 | S2,S3,S1B | C1-Discharge<br>C2-Hold | 2VIN/3 |
| Phi1,Phi3 | S1,S3,S2B | C1-Charge<br>C2-Discharge | 2VIN/3 |
| Phi1,Phi2,Phi3 | S1,S2,S3 | Hold | VIN |

Figure 4B

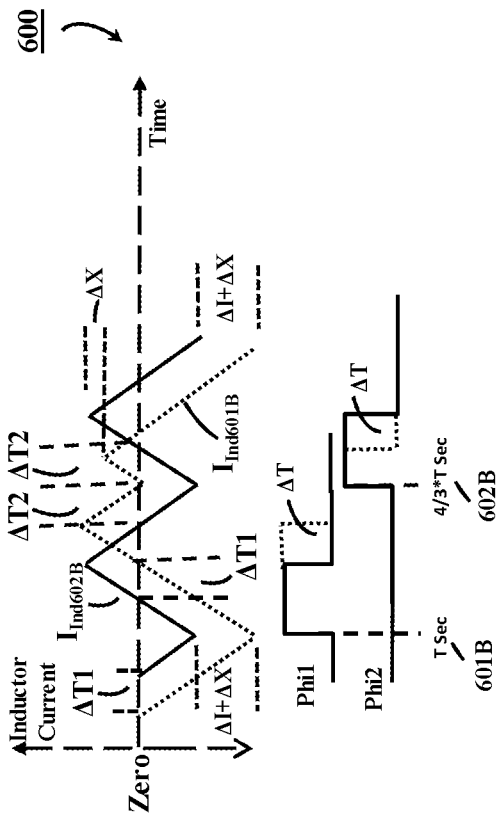
Figure 6A
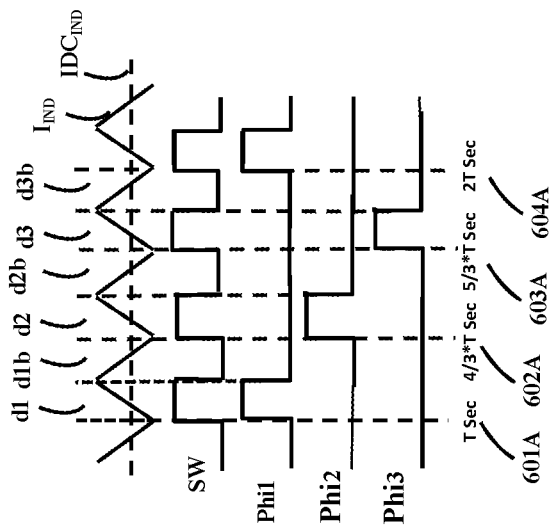
Figure 6B
| Capacitor Voltage Regulation Scheme | Figure Shown | Decrease in Peak Inductor Current when Phi2 High =[ΔI/ΔT*(2*Δd1b+2*Δd1-4*Δd2b)/4] | Net Decrease in Capacitor Charge |
|---|---|---|---|
| Trailing Edge | Figure 7B | Zero | -(2*ΔI*ΔT) |
| Leading Edge | Figure 7C | 0.5*ΔI | Zero |
| Both Edges | Figure 7D | 0.5*ΔI | -(2*ΔI*ΔT) |
| Time Shift | Figure 7E | 0.5*ΔI | 2*ΔI*ΔT |
Figure 6C

METHOD AND APPARATUS FOR CONTROL OF SWITCH MODE POWER SUPPLIES UTILIZING MAGNETIC AND CAPACITIVE CONVERSION MEANS

RELATED APPLICATION

This continuation in part patent application claims priority of pending U.S. application Ser. No. 14/693,746 filed Apr. 22, 2015 by the same inventor titled "Method and Apparatus for Switch Mode Power Supply" which is hereby incorporated herein by reference.

FIELD OF THE INVENTION

The present invention pertains to power supplies and regulators. More particularly, the present invention relates to method and apparatus for control of switch mode power supplies utilizing magnetic and capacitive conversion means.

BACKGROUND OF THE INVENTION

The advent of low voltage digital circuitry in present day electronics resulted in the use of many power converters which, for example, take the input power supply, ex. battery power, and down convert the battery voltage to a voltage suitable for operation of the electronic circuitry. Switch mode power supplies are needed and used in many electronic devices as they are more efficient in power conversion than linear regulator power supplies. Switch mode power supplies can be either magnetic based or capacitor based.

In a regular magnetic based buck converter, one terminal of the inductor is connected to the output and the other terminal is switched between the voltages equal to the positive supply (input voltage) and negative supply (generally, ground) with the time duration of the positive supply as a fraction of one switching period being represented by a duty cycle.

Magnetics based converters are efficient but need magnetic components like Inductors and transformers which are bulky. In addition to making electronic devices bigger, the bulky magnetic components, due to their larger height, have a further disadvantage that they cannot be co-packaged with the components they are powering. As the converters are placed further away from the components they are powering, the increased parasitic trace resistances and capacitances further decrease the conversion efficiency and bandwidth. Furthermore, as the current in a magnetic component cannot be changed instantaneously, the presence of magnetic components limits the loop bandwidth of the converter.

Another conversion approach is the use of a switched capacitor based converter. FIG. 1 shows, generally at 100, a 2:1 step-down converter. It consists of two capacitors C1 and C2 and four switches S1, S2, S3 and S4. These four switches are operated by two anti phase clocks Phi1 and Phi2. When Phi1 is high, switches S1 and S3 are ON and switches S2 and S4 are OFF, thus connecting the capacitors C1 and C2 in series with the input VIN and ground. Therefore, the sum of the voltages on these capacitors must be equal to the input voltage VIN. When Phi2 is high, switches S2 and S4 are turned ON and switches S1 and S3 are OFF, thus connecting the capacitors C1 and C2 in parallel with each other and in turn parallel with the output VOUT. This equalizes the voltages on both the capacitors. Since the sum of the voltages on the capacitors is equal to the input voltage VIN and in addition, these two capacitors carry equal voltages, the voltage across each capacitor is therefore equal to half of the input voltage VIN.

Capacitors have a ripple voltage around their steady state value of VIN/2. When Phi2 is high, capacitor C1 is discharging and capacitor C2 is charging and when Phi1 is high, C1 is charging from VIN and C2 is discharging by a load at VOUT. When Phi1 goes high, C1 is instantaneously charged such that sum of the voltages on C1 and C2 are equal to VIN. The charge current and charge speed are only limited by the switch resistances. Similarly, when Phi2 goes high, C2 is charged instantly such that voltages on C1 and C2 are made equal. Every switching cycle energy equal to $\frac{1}{2}*C*(\Delta V)^2$, where C is equal to the capacitance value and $\Delta V$ is the capacitor voltage ripple, is lost as heat. Furthermore, since capacitor voltages are regulated by a combination of putting them in parallel and then putting them in series with the input, only discrete voltage conversion ratios are possible. For example, with two capacitors, each capacitor can only be regulated to VIN/2; therefore, if a voltage other than VIN/2 is required, then it is not possible with two capacitors. This type of converter does not need the bulky magnetic components like inductors but since only discrete voltage conversion ratios are possible, switched capacitor based converters are only efficient when the desired output voltage is close to the discrete voltage conversion ratio possible with the converter.

Thus there is a need for a power supply which is compact with decreased magnetic component size, efficient, has a better and more efficient capacitor voltage regulation, which offers wider bandwidth without impacting conversion efficiency and which is integration friendly with the components it is powering. This presents a technical problem for which a technical solution using a technical means is needed.

BRIEF DESCRIPTION OF THE DRAWINGS

The invention is illustrated by way of example and not limitation in the figures of the accompanying drawings.

FIG. 2 illustrates a Digital to Analog Conversion (DAC) based step-down converter of the present invention.

FIG. 2A illustrates an example waveform for the DAC based step-down converter of the present invention.

FIG. 2B illustrates an example waveform for the DAC based step-down converter of the present invention.

FIG. 4B illustrates the operation of the step-down converter of FIG. 4 based on the value of the control signals.

FIG. 6A illustrates example waveform for control signal for the switched capacitor array DAC and inductor current of the present invention FIG. 6B illustrates variation in inductor current when switched capacitor array DAC control signal are varied.

FIG. 6C summarizes net capacitor charge change per different capacitor voltage regulation schemes.

DETAILED DESCRIPTION

Figure 1:
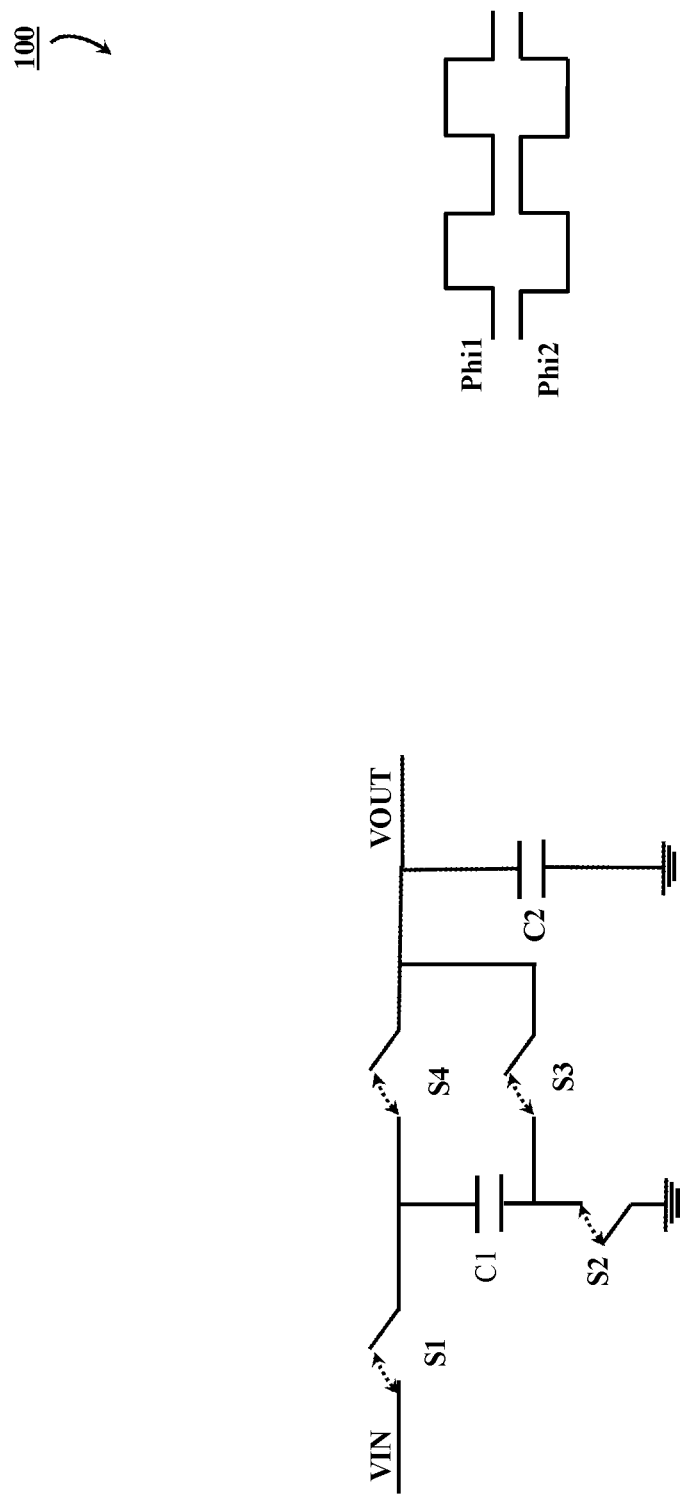
FIG. 1 illustrates a prior art switched capacitor based step-down converter.

The power supply of the present application is compact with decreased magnetic component size and value, efficient, which offers wider bandwidth without impacting conversion efficiency, and which is integration friendly with the components it is powering. In addition, capacitor voltage is regulated more efficiently without the charge transfer energy loss present in a typical switched capacitor regulator. The operation of this power supply is summarized below.

FIG. 2 shows, generally at 200, an improved step-down converter as per the present invention. It consists of a Digital to Analog Converter (DAC) as shown by 201 with its output terminal SW connected to one terminal of the inductor L and the second terminal of the inductor is connected to the output of the power supply VOUT and the capacitor 208 is the energy storing capacitor at the output.

The DAC is connected between the positive supply (eg. Input voltage VIN 204) and the negative reference (eg. Ground 203). The inductor current ramp up and ramp down voltages are generated by the DAC at SW node. These inductor current ramp up and ramp down voltages are a much smaller fraction of the input voltage at VIN. For an N bit DAC input 202, the DAC output voltage equals the number of bits in the N-bits being high multiplied by VIN/N (as shown in 205), where VIN being the positive supply voltage 204. Therefore, if N−1 bits are high, the voltage at the switch node SW is equal to VIN*(N−1)/N. The N-bit code is generated based on the required voltage at the output VOUT. If VIN*(N−1)/N>VOUT>VIN*(N−2)/N, then by switching the DAC code between two values N−1 and N−2, the voltages at SW will be VIN*(N−1)/N (shown as 206) and VIN*(N−2)/N (shown as 207) with the voltage VIN*(N−1)/N charging the inductor L and the voltage VIN*(N−2)/N discharging the inductor. The differential between charging and discharging voltage is equal to VIN/N and it is N times smaller than a regular buck converter where the charging voltage is VIN and discharge voltage is zero. Therefore, the inductor of the power supply in FIG. 2 could be made N times smaller than a regular buck converter for same inductor current ripple.

Furthermore, if the N-Bit DAC code is N duty cycle signals each shifted in time by T/N from the previous signal, wherein T is the time period of one switching cycle, then the inductor charging and discharging voltages at SW node will be automatically generated based on the required voltage VOUT and in addition, these voltages will be generated N times in one clock period, thus effectively increasing switching frequency by N, thus the inductor value could be made further smaller by N with a combined reduction of N*N. This is further illustrated in FIGS. 2A and 2B for a 3-Bit DAC.

FIG. 2A illustrates the scenario when required VOUT is less than VIN/3. DAC1, DAC2 and DAC3 represent the three bit DAC code (eg 202 in FIG. 2) and are also time shifted duty cycles shifted in time by T/3 seconds, thus DAC1 goes high at T Sec (Seconds) (shown at 201A), DAC2 goes high at 4/3*T Sec (shown at 202A) and DAC3 goes high at 5/3*T Sec (shown at 203A). This cycle repeats with DAC1 going high again at 2T Sec (shown at 204A). Since in this case, VOUT is less than VIN/3, the duty cycle will be less than 33% and since the duty cycle signals are shifted by 33%, there is no overlap in time where more than one duty cycle signal is high. Thus the DAC code (i.e. the number bits are simultaneously high) will be switching between 0 and 1 and is repeated three times in one switching cycle and thus the voltage at SW node will be switching between Zero 208A and VIN/3 207A and as illustrated in FIG. 2A, effective frequency at SW is 3 times the clock frequency 1/T. The voltage VIN/3 at SW causes inductor current to ramp up as shown by $\Delta I_{Ind205A}$ around its average value $IDC_{IND}$ as VIN/3 is higher than VOUT and the zero voltage at SW causes inductor current to discharge by $\Delta I_{Ind206A}$. Therefore, with a three bit DAC, the inductor charge-discharge differential is one-third (VIN/3) and the effective frequency is 3× causing a 9× reduction in inductor value.

Similarly, FIG. 2B illustrates the scenario when the required voltage at VOUT is greater than VIN/3 but less than 2*VIN/3. DAC1, DAC2 and DAC3 represent the three bit DAC code (eg 202 in FIG. 2) and are also time shifted duty cycles shifted in time by T/3, thus DAC1 goes high at T Sec (shown at 201B), DAC2 goes high at 4/3*T Sec (shown at 202B) and DAC3 goes high at 5/3*T Sec (shown at 203B). This cycle repeats with DAC1 going high again at 2T Sec (shown at 204B). Since in this case, VOUT is greater than VIN/3 but less than 2*VIN/3, the duty cycle will be greater than 33% but less than 66% and since the duty cycle signals are shifted by 33%, there is overlap in time where two duty cycle signals are high. Thus the DAC code (i.e. the number bits are simultaneously high) will be switching between 1 and 2 and is repeated three times in one switching cycle and thus the voltage at SW node will be switching between VIN/3 (shown as 208B) and 2*VIN/3 (207B) and as illustrated in FIG. 2B, effective frequency at SW again is 3 times the clock frequency 1/T. The voltage 2*VIN/3 at SW causes inductor current to ramp up as shown by $\Delta I_{Ind205B}$ around its average value $IDC_{IND}$ as 2*VIN/3 is higher than VOUT and the voltage VIN/3 at SW causes inductor current to discharge by $\Delta I_{Ind206B}$ as VOUT is greater than VIN/3. Therefore, with a three bit DAC, the inductor charge-discharge differential is again one-third (VIN/3) and the effective frequency is 3× causing a 9× reduction in inductor value.

FIG. 2, FIG. 2A and FIG. 2B illustrate the improved power supply as per the present invention with a step-down converter. However, this power supply can be used with other topologies as well.

Figure 2C:
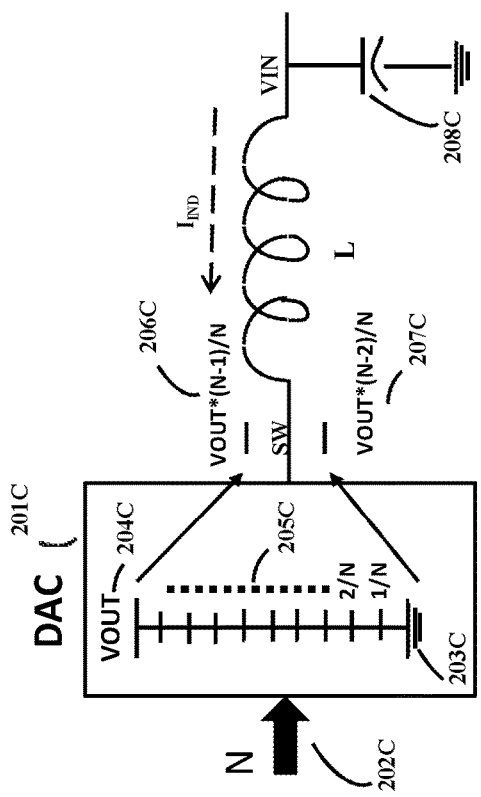
FIG. 2C illustrates a Digital to Analog Conversion (DAC) based step-up converter of the present invention.

FIG. 2C illustrates the use of this topology for a step-up converter. In this topology, the VIN and VOUT are swapped compared to the step-down converter of FIG. 2. The N-Bit DAC 201C is connected between power supply output VOUT 204C and the negative reference 203C (ground as an example) and the Inductor L is connected between the input VIN and the DAC output SW and the inductor current $I_{IND}$ direction is reversed (i.e. flowing into the DAC compared to step-down converter in FIG. 2 wherein inductor current is flowing out of the DAC). Capacitor 208C is the energy storing capacitor at the input.

Based on the N-Bit code input (as shown at 202C), the DAC generates a voltage at its output (as shown in 205C) SW whose value being equal to VOUT*(N−Number of DAC input bits high)/N, where VOUT is the voltage at the power supply output 204C. Therefore if none of the DAC input bits are high, the voltage generated at the SW node will be VOUT*N/N i.e. VOUT. DAC code is generated based on the required output voltage. For example if the required voltage at the power supply output is such that (N−1)/N*VOUT>VIN>(N−2)/N*VOUT, DAC code (i.e. the number bits are simultaneously high) will switch between 1 and 2 every clock cycle and the voltages generated at the SW will be VOUT*(N−1)/N (as shown at 206C), which will discharge the inductor L current and VOUT*(N−2)/N (as shown at 207C) which will charge the inductor L. The differential between inductor charging and discharging voltages is VOUT/N which is N times smaller than a typical boost converter where the charging and discharging voltages are VOUT and ground. Therefore, similar to the step-down converter, the inductor of the improved step converter, as per the present invention, could be made N times smaller compared to the typical boost converter.

Figure 2E:
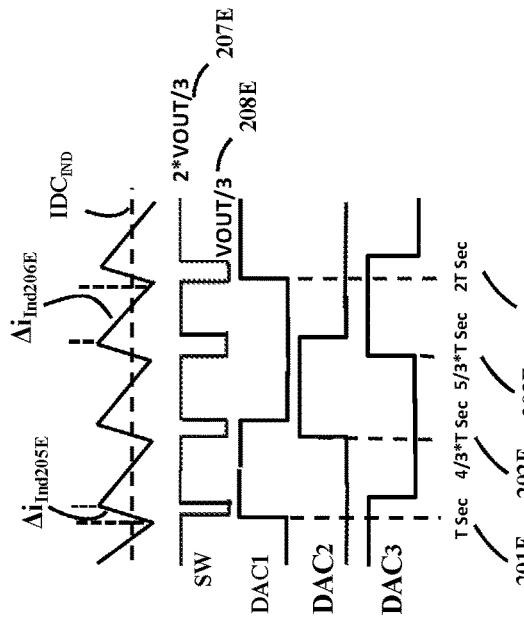
FIG. 2E illustrates an example waveform for the DAC based step-up converter of the present invention.
Figure 2D:
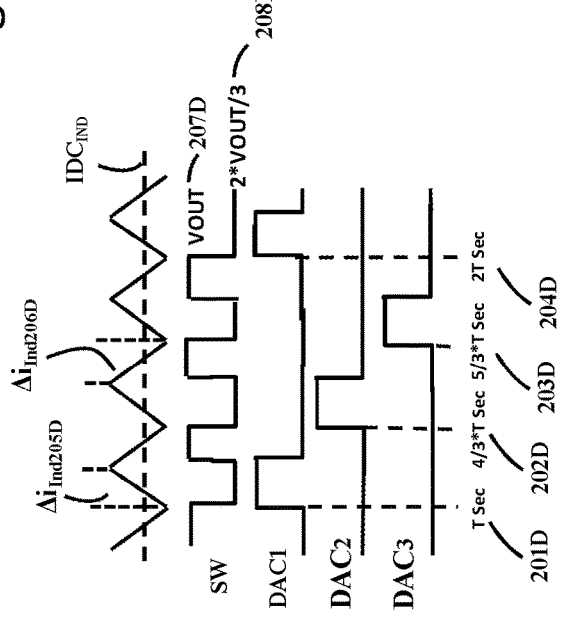
FIG. 2D illustrates an example waveform for the DAC based step-up converter of the present invention.

Similar to the step-down converter in FIGS. 2A and 2B, the N bit DAC input for the step-up converter of FIG. 2C can be generated by time shifting the each of N duty cycle signals in time by T/N seconds from the previous signal, where T is the time period of one switching cycle. FIGS. 2D and 2E show the DAC input signals for a 3 bit DAC shifted in time by T/3 seconds with DAC1 going high at T Sec (Seconds) (as shown at 201D, 201E), followed by DAC2 going high at 4/3*T Sec (as shown at 202D, 202E), followed by DAC3 going high at 5/3*T Sec (as shown at 203D, 203E) and this cycle repeating again periodically with DAC1 going high again at 2T Sec (as shown at 204D, 204E). In FIG. 2D, the required output voltage VOUT is such that VOUT>VIN>⅔*VOUT, therefore duty cycle is less than 33% and since duty cycle signals are shifted by 33% in time, there is no overlap in the duty cycle signals and the DAC code will be switching between 0 and 1, three times in a clock period with DAC output voltages being VOUT (as shown at 207D) when all the DAC input bits are zero and ⅔*VOUT (as shown at 208D) when only one of the DAC inputs is high. Voltage equal to ⅔*VOUT at SW charges inductor current (as VIN is >⅔*VOUT in this example) by an amount $\Delta I_{Ind205D}$ around its average value $IDC_{IND}$ and a voltage equal to VOUT at SW node discharges inductor current by $\Delta I_{Ind206D}$ as VOUT is >VIN and this is repeated three times in one clock period increasing effective switching frequency by 3 and thus further decreasing the inductor value. Similarly in the example of FIG. 2E, the required output voltage VOUT is such that ⅔*VOUT>VIN>⅓*VOUT, therefore duty cycle is greater than 33% but less than 66% and since duty cycle signals are shifted by 33% in time, two duty cycle signals could be high together and the DAC code will be switching between 1 and 2, three times in a clock period with DAC output voltages being ⅔*VOUT (as shown at 207E) when only one DAC input bit is high and ⅓*VOUT (as shown at 208E) when two of the DAC inputs are high. Voltage equal to ⅓*VOUT at SW charges inductor current (as VIN is >⅓*VOUT in this example) by an amount $\Delta I_{Ind205E}$ around its average value $IDC_{IND}$ and a voltage equal to ⅓*VOUT at SW node discharges inductor current by $\Delta I_{Ind206E}$ as ⅔*VOUT is >VIN and this is repeated three times in one clock period.

Figure 3:
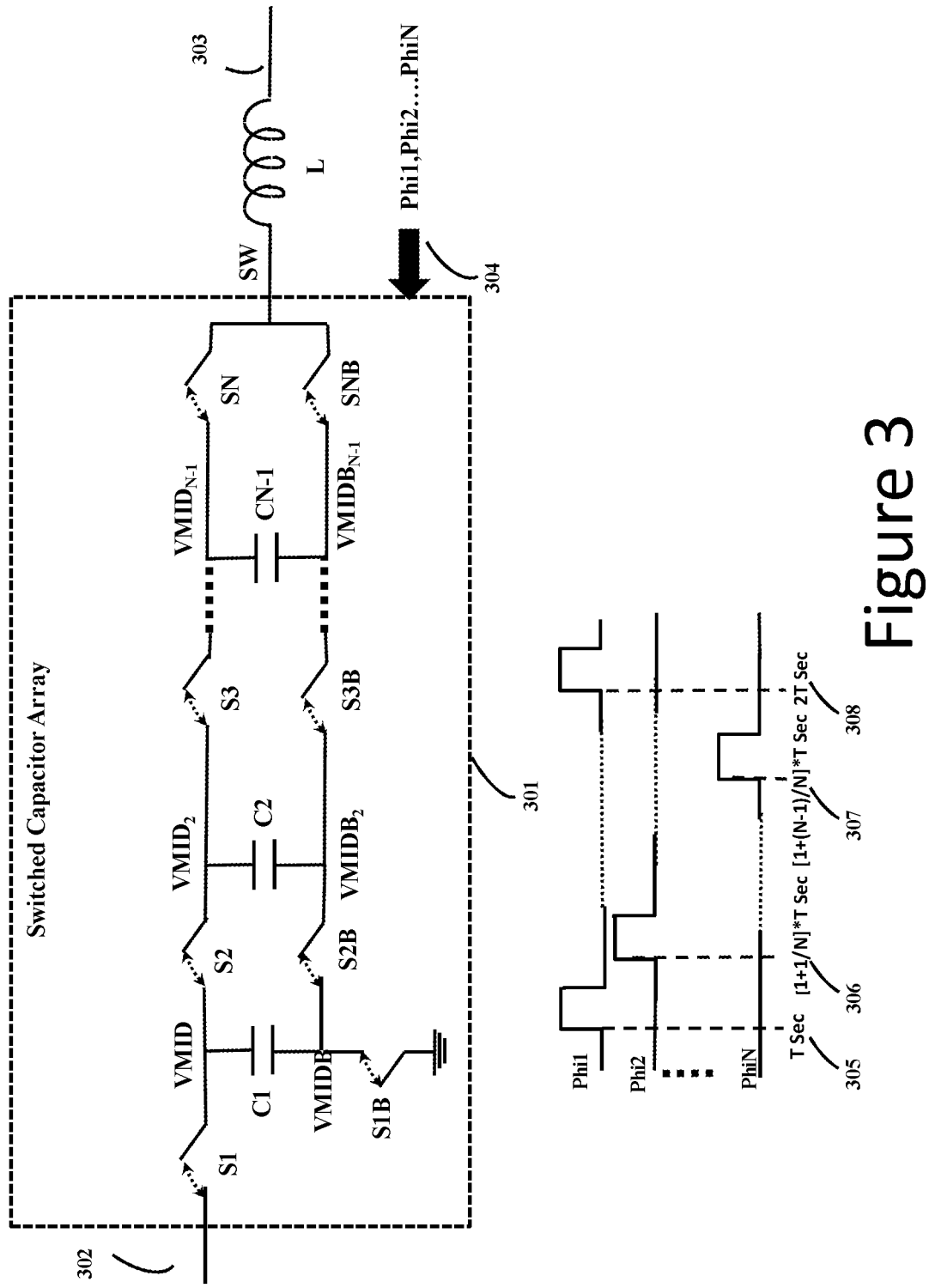
FIG. 3 illustrates one example of the DAC implementation with switched capacitor array as per the present invention.

FIG. 3 shows, generally at 300, an implementation of a DAC in FIGS. 2 and 2C according to one embodiment of the present invention. The N-bit DAC 301 consists of N switches S1, S2, S3 . . . SN connected between the DAC terminals 302 and SW and an additional N switches S1B, S2B, S3B . . . SNB connected between ground and SW terminals. In addition the DAC also consists of N−1 capacitors C1, C2 . . . CN−1 connected between the switches, with one end of capacitor C1 connected between the switches S1 and S2 at VMID and the other end connected between the switches S1B and S2B at VMIDB. Similarly, one end of capacitor C2 is connected between the switches S2 and S3 at $VMID_2$ and the other end is connected between the switches S2B and S3B at $VMIDB_2$ and so on with capacitor CN−1 connected between the nodes $VMID_{N-1}$ and $VMIDB_{N-1}$.

The state of the DAC switches is controlled by the item 304, the N-bit DAC control input Phi1, Phi2 . . . PhiN. When Phi1 is high, the switch S1 is ON and the complimentary switch S1B is OFF and when Phi1 is low, switch S1 is OFF and S1B is ON. Similarly the other DAC control bits control the state of the other switches. As explained with reference to the DAC in FIG. 2 and FIG. 2C, the N-bit DAC control input 304 can be generated by time shifting the N duty cycle signals in time equal to T/N seconds, where T is the time period of one clock cycle, with Phi1 going high at T Sec (Seconds) (as shown at 305), Phi2 going high at [1+1/n]*T Sec (as shown at 306) and so on with PhiN going high at [1+(N−1)/N]*T Sec (as shown at 307) and this cycle repeats itself with Phi1 going high again at 2T Sec (as shown at 308).

The DAC 301 can be used for step-down as well as step-up power conversion. If the terminal 302 is connected to the input voltage VIN (example 204 in FIG. 2) and the inductor terminal 303 to the power supply output (example VOUT in FIG. 2), the DAC 301 performs a step-down operation with inductor L current flowing out of the SW node of the DAC and into inductor L. If the terminal 302 is connected the power supply output (example VOUT 204C in FIG. 2C) and the terminal 303 of the inductor L is connected to the input supply (example VIN in FIG. 2C), the DAC 301 performs a step-up operation with inductor L current flowing into the SW node of the DAC. For the proper operation of the DAC, the capacitor voltages must be regulated with voltage on C1 being made equal to $(N-1)/N*V_{302}$, where $V_{302}$ is the voltage at the node 302 being equal to input voltage VIN for a step-down operation and being equal to the output voltage VOUT for a step-up operation. Similarly, voltage on C2 must be equal to $(N-2)/N*V_{302}$ and so on with voltage on the capacitor CN−1 made equal to $(N-[N-1])/N*V_{302}$ i.e. $1/N*V_{302}$.

Figure 4A:
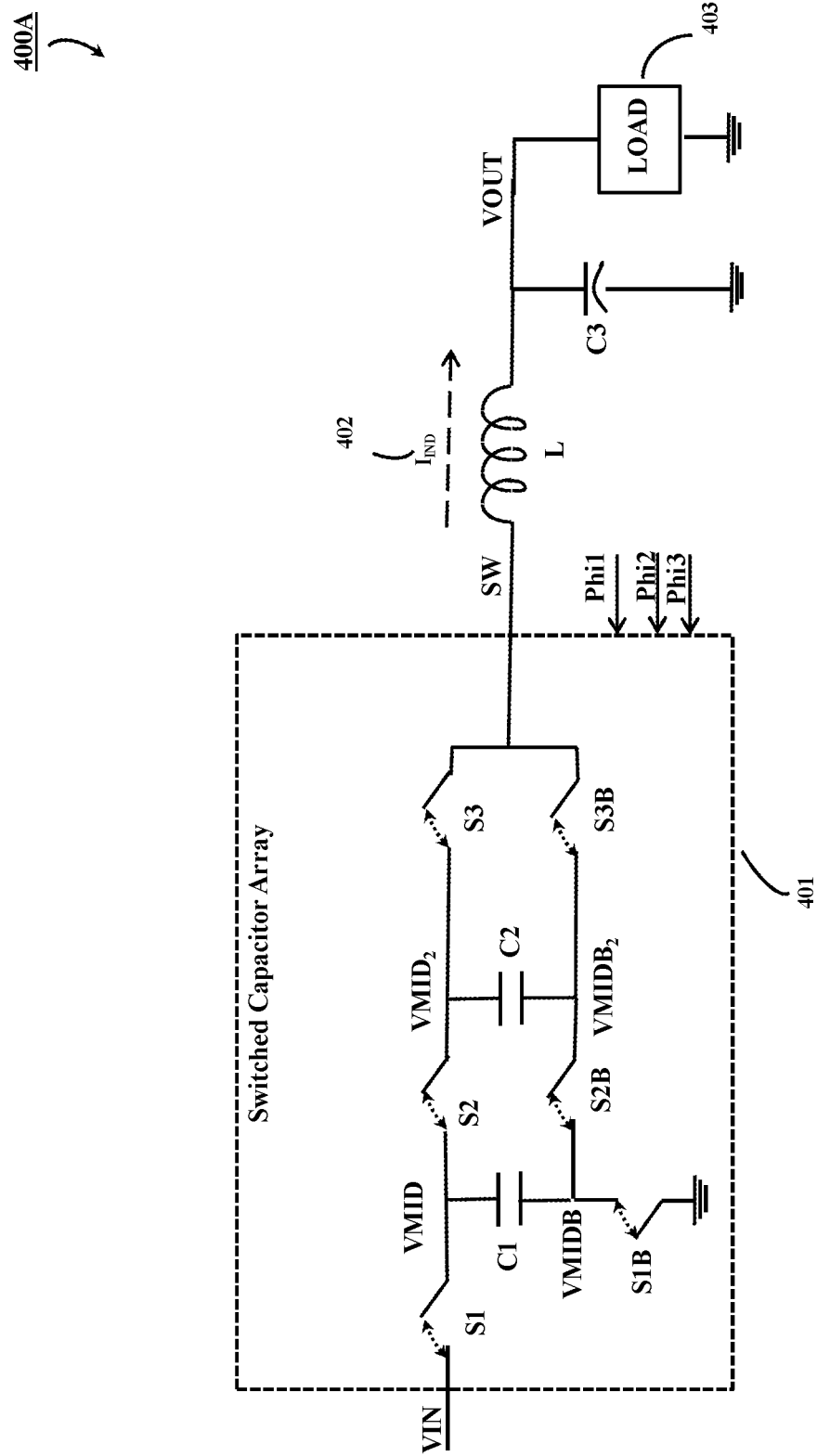
FIG. 4A illustrates one embodiment of the step-down converter of the present invention.

FIG. 4A, generally at 400A, illustrates the use of a three bit DAC 401 connected in step-down configuration. The DAC is a switched capacitor array consisting of three switches S1, S2, and S3 connected between the power supply input VIN and the DAC output terminal SW and three complimentary switches S1B, S2B and S3B connected between SW node and ground. The switches are controlled by three control inputs Phi1, Phi2, and Phi3 with S1 being ON, S1B being OFF when Phi1 is high and vice versa. Similarly, Phi2 controls switches S2 and S2B and Phi3 control S3 and S3B. The DAC has two capacitors C1 and C2, with C1 connected between VMID and VMIDB and charged to ⅔*VIN where VIN is the input supply voltage and C2 connected between $VMID_2$ and $VMIDB_2$ and charged to ⅓*VIN. Inductor L is connected between the SW node and the output of the power supply VOUT. C3 is the charge storage capacitor at the output and the load 403 draws current from the output VOUT. Since the DAC 401 is supplying the current to the load in the step-down operation, the inductor current $I_{IND}$ 402 flows out of SW node.

The Table in FIG. 4B, generally at 400B, summarizes the state of switches and capacitors in the DAC 401 as a function of the DAC control inputs Phi1, Phi2, and Phi3. When the capacitors C1 and C2 are charged to ⅔*VIN and ⅓*VIN respectively, the voltage on the SW node is equal to the number of control bits Phi1, Phi2, and Phi3 being high multiplied by VIN/3 as shown in the table of FIG. 4B and generate the waveforms at SW node similar to the ones shown in FIGS. 2A and 2B. Further explanation on the operation of the DAC can be found in the co-pending U.S. application Ser. No. 14/693,746. As explained in that application, the capacitors C1 and C2 are charged and discharged by the current $I_{IND}$ flowing through the Inductor L. Since in steady state, ignoring the small current ripple, the inductor current is constant, the voltage stored across the capacitors C1 and C2 can be controlled by controlling the charge time duration with respect to discharge time duration (as the capacitor voltage is given by the equation I*T/C, where I is the current flowing through capacitor, T is the time duration and C is the capacitance value).

Figure 4C:
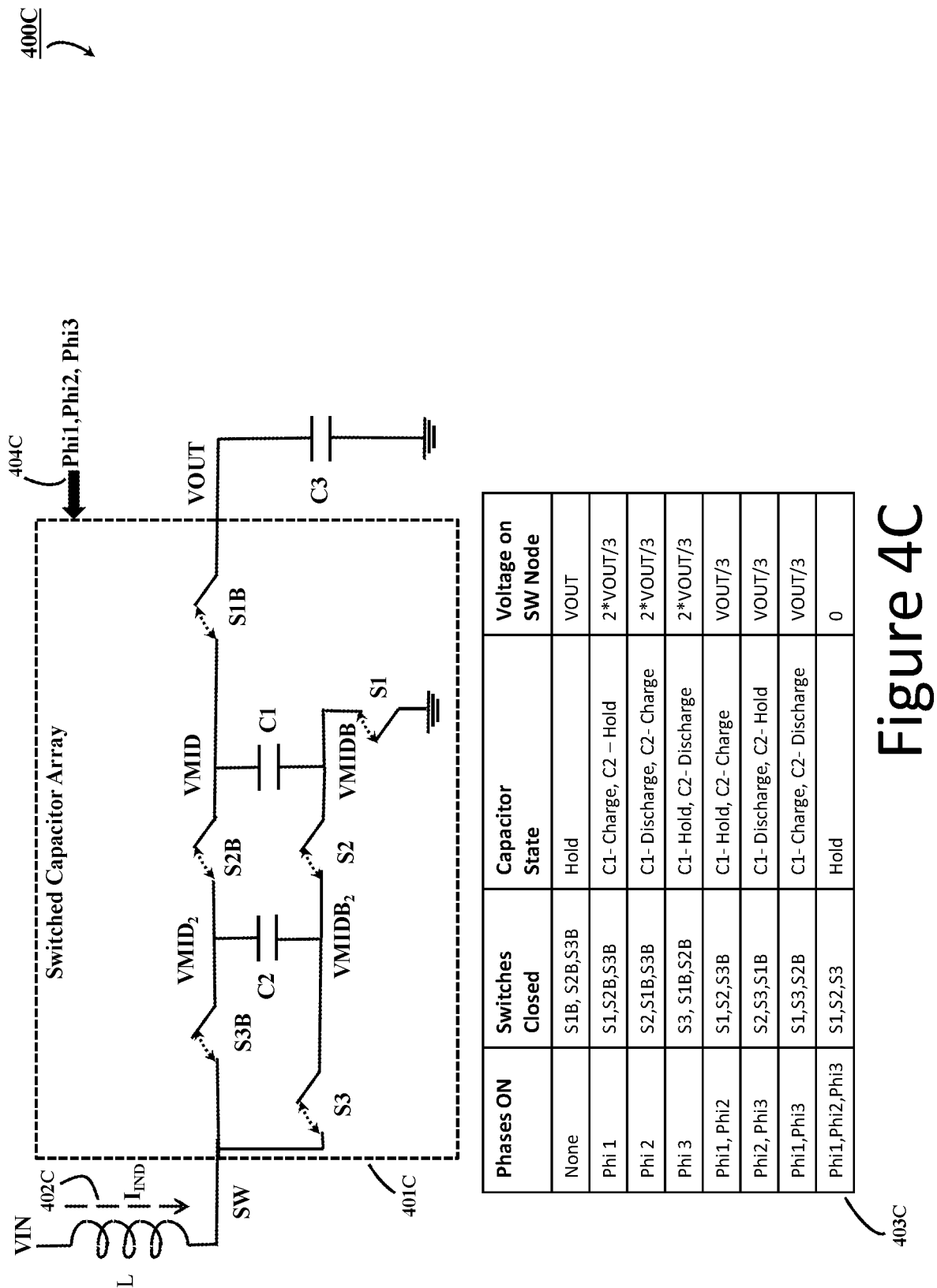
FIG. 4C illustrates one embodiment of the step-up converter of the present invention.

Similarly, FIG. 4C illustrates, generally at 400C, the use of a three bit switched capacitor array DAC 401C connected in step-up configuration. The DAC consists of three switches S1B, S2B, and S3B connected between the power supply output VOUT and the DAC output terminal SW and three switches S1, S2 and S3 connected between SW node and ground. The switches are controlled by three control inputs Phi1, Phi2, and Phi3 (as shown at 404C) with S1 being ON, S1B being OFF when Phi1 is high and vice versa. Similarly, Phi2 controls switches S2 and S2B and Phi3 control S3 and S3B. Comparing this to the operation of the step-down DAC, the switches connected between SW and ground (low side switches) turn-on when their corresponding control signals are high whereas in the step-down converter, the switches connected between VIN and SW (high side switches) turn-on when their corresponding control signals are high and their complimentary switches connected between SW and ground turn-off. The DAC has two capacitors C1 and C2, with C1 connected between VMID and VMIDB and charged to ⅔*VOUT where VOUT is the output voltage and C2 connected between $VMID_2$ and $VMIDB_2$ and charged to ⅓*VOUT. Inductor L is connected between the SW node and the input of the power supply VIN. C3 is the charge storage capacitor at the output VOUT. In the step-up operation, the inductor current $I_{IND}$ 402C is in the reverse direction as compared to that of the step-down operation and flows into SW node.

The Table 403C in FIG. 4C summarizes the state of switches and capacitors in the DAC 401C as a function of the DAC control inputs Phi1, Phi2, and Phi3. When the capacitors C1 and C2 are charged to ⅔*VOUT and ⅓*VOUT respectively, the voltage on the SW node is equal to the (N-number of control bits Phi1, Phi2, and Phi3 being high) multiplied by VOUT/3 as shown in the table 403C and generate the waveforms at SW node similar to the ones shown in FIGS. 2D and 2E. Further explanation on the operation of the DAC can be found in the co-pending U.S. application Ser. No. 14/693,746. As explained in that application, the capacitors C1 and C2 are charged and discharged by the current $I_{IND}$ flowing through the Inductor L. Since in steady state, ignoring the small current ripple, the inductor current is constant, the voltage stored across the capacitors C1 and C2 can be controlled by controlling the charge time duration with respect to discharge time duration (as the capacitor voltage is given by the equation I*T/C, where I is the current flowing through capacitor, T is the time duration and C is the capacitance value).

As explained above with reference to the DACs 301, 401, and 401C, the capacitor voltages need to be regulated to the required values for proper operation of the power supply. If the capacitor voltages are not regulated, they will continue to either charge or discharge each switching clock cycle and over time will either become equal to zero or $V_{302}$, where $V_{302}$ is the voltage at the node 302 in FIG. 3 (i.e. input voltage VIN for a step-down operation and the output voltage VOUT for a step-up operation). If the capacitors are charged to VIN (VOUT for step-up) or discharged to ground, then the voltage at SW node of the DAC will be VIN (VOUT for step-up) or zero rather than a fraction X/N of VIN (fraction [N−X]/N of VOUT for step-up) based on X number of control inputs of N-bit DAC being high causing improper operation of the power supply.

Figure 5:
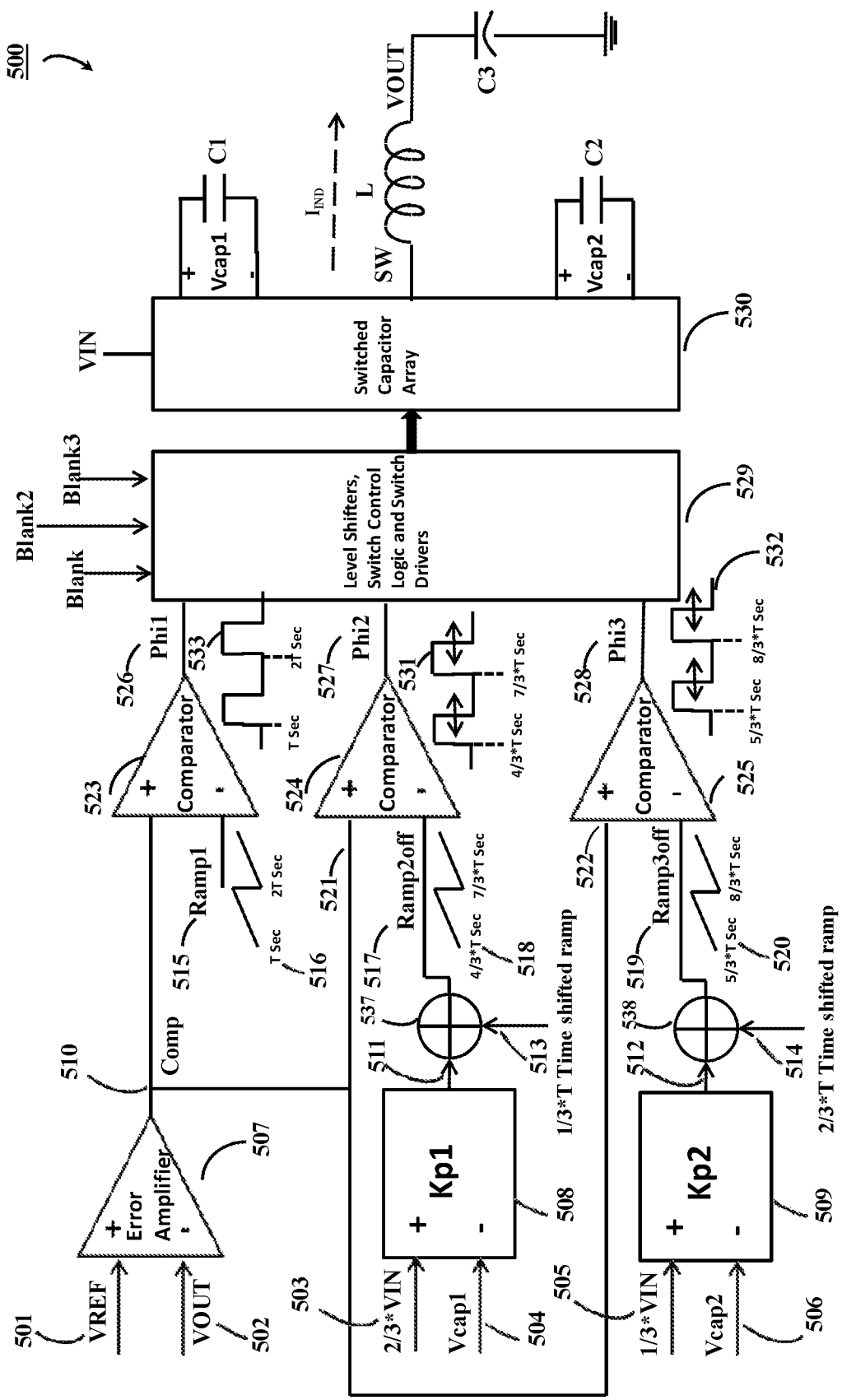
FIG. 5 illustrates one embodiment of generation of control signals for driving the switches in the switched capacitor array of the present invention.

Control loop 500 in FIG. 5 shows an example pulse width modulation (PWM) control loop for regulation of the output voltage VOUT of the step-down power supply with input supply voltage VIN. The switched capacitor array 530 is a DAC and could be, as an example, a 3-bit DAC 401 shown in FIG. 4A with two capacitors C1 and C2. Inductor L is connected between the DAC output SW and power supply output VOUT. C3 is the energy storing capacitor at the output VOUT. Similar to a regular step-down converter, output voltage is regulated by comparing the output voltage VOUT (shown at 502) to a reference voltage VREF 501 with an error amplifier 507. Error amplifier 507 generates the error signal Comp 510 based on the difference between the VREF and VOUT voltages, the higher the VREF 501 voltage compared to VOUT 502, the higher the voltage at Comp 510. Comparator 523 is the PWM comparator and generates the duty cycle signal Phi1 526. PWM comparator 523 compares the Comp 510 signal, at its positive input, with the periodic ramp signal Ramp1 515 with a clock period equal to T Sec (Seconds) at its negative input as shown at 516. As the Ramp1 signal starts with zero at T Sec, Comp 510 voltage (positive input of the comparator 523) will be higher than the Ramp1 voltage in steady state and therefore the PWM comparator 523 output Phi1 goes high at T Sec. As Ramp1 increases in voltage and reaches the voltage at Comp 510, the comparator 523 makes the output Phi1 go low. If VOUT is lower than VREF, Comp voltage will be higher and it takes more time for Ramp1 to reach Comp voltage and the duty cycle signal Phi1 will stay high longer. As high Phi1 turns ON the corresponding high side switch in the switched capacitor array 530 (example switch S1 in FIG. 4), thus keeping the voltage at SW node to charge inductor longer and thus increasing the inductor L current which increases the output voltage VOUT. Similarly, when VOUT is higher than VREF, the duty cycle signal Phi1 duration is decreased causing VOUT to decrease. In the steady state when VOUT and VREF are equal, the error amplifier 507 makes the voltage at Comp node such that the required duty cycle Phi1 is generated for the power supply to keep VOUT equal to VREF. In this example, Phi1 always goes high at T Sec, 2T Sec etc (i.e. the leading or rising edge is unmodulated) but the falling (trailing) edge of the Phi1 is modulated (changed) for the output voltage regulation.

As discussed above, for a 3 bit DAC 530 three time shifted duty cycles shifted in time by ⅓*T Sec (Seconds) from one another are needed. Phi2 (item 527) and Phi3 (item 528) show the time shifted duty cycles shifted in time from the duty cycle Phi1 (item 526). Comparators 524 and 525 use the same Comp signal voltage 510 (denoted 521 at comparator 524, and denoted 522 at comparator 525), used by the comparator 523 to generate Phi1, for generating Phi2 and Phi3 signals. Ramp2off (item 517) signal is generated by time shifting the Ramp1 (item 515) by ⅓ times one clock period T seconds (item 513) and adding 537 a signal 511 equal to Kp1*(⅔*VIN (item 503)−Vcap1 (item 504)) generated by the proportional gain block 508 where Kp1 is the gain of the block 508. Vcap1 as shown in FIG. 5 is the voltage across the capacitor C1. As mentioned above with reference to the capacitor C1 in the 3-bit DAC 401 in FIG. 4, for proper operation the voltage stored in the capacitor C1 in steady state should be made equal to ⅔*VIN (where VIN is the voltage of the input power source). When the voltage across the capacitor C1 is regulated and equals ⅔*VIN, the output 511 of the proportional gain block 508 is close to zero as (⅔*VIN−Vcap1) approaches zero. Thus in steady state Ramp2off is identical to Ramp1 other than that it is time shifted from Ramp1 by ⅓*T Sec. Illustrated at 518 is a sample waveform for Ramp2off. Since comparator 524 is using the same COMP (item 510) signal and compares it with Ramp2off and generates Phi2, in steady state when capacitor C1 voltage is regulated, Phi2 resembles Phi1 (that is, high and low durations match that of Phi1) and it is just a time shifted version of Phi1 shifted in time from Phi1 by ⅓*T Sec.

If the voltage across the capacitor C1 goes out of regulation, for example is lower than the required voltage of ⅔*VIN, then the output 511 of the proportional gain block 508 is non zero and goes higher, thus causing the Ramp2off to go higher, this makes the output of the comparator 524 to go low sooner as Ramp2off crosses COMP voltage sooner, thus reducing the time during which Phi2 is high. If the high time of Phi2 is decreased, as the capacitor C1 is discharged when Phi2 is high (as shown in the table of FIG. 4B), the amount of discharge of capacitor C1 is decreased compared to the charge build up in C1 (as seen from table in FIG. 4B, C1 is charged when Phi1 is high and since high time of Phi2 is now decreased compared to Phi1 and since C1 is charged and discharged with inductor L current which is constant ignoring the small current ripple). Thus the voltage stored in C1 keeps building up until it reaches the steady state value of ⅔*VIN. Similarly opposite action takes place when C1 has a higher voltage than ⅔*VIN until it reaches the steady state regulated value of ⅔*VIN. Thus the voltage across C1 is regulated by making the pulse Phi2 shorter or longer compared to Phi1 as the Ramp2off crosses Comp node faster or slower than Ramp1 based on the voltage at the node 511. Thus, the capacitor voltage regulation is done in this example by modulating the trailing (falling) edge of the duty cycle signal Phi2 and is illustrated with an example waveform 531 wherein Phi2 always goes high at ⅓*T Sec later than Phi1 (example at 4/3*T Sec and 7/3*T Sec compared to T Sec and 2T Sec for Phi1 as illustrated in 533) but the trailing (falling) edge is modulated, as shown by the arrowed lines, based on the offset voltage at 511.

Similarly, Ramp3off (item 519) signal is generated by time shifting the Ramp1 by ⅔ times one clock period T Sec (seconds) (514) and adding 538 a signal 512 equal to Kp2*(⅓*VIN (505)−Vcap2 (506)) generated by the proportional gain block 509 wherein Kp2 is the gain of the block 509. Vcap2 as shown in FIG. 5 is the voltage across the capacitor C2. As mentioned above with reference to the capacitor C2 in the 3-bit DAC 401 in FIG. 4, for proper operation the voltage stored in the capacitor C2 in steady state should be made equal to ⅓*VIN (where VIN is the voltage of the input power source). When the voltage across the capacitor C2 is regulated and equals ⅓*VIN, the output 512 of the proportional gain block 509 is close to zero as (⅓*VIN−Vcap2) approaches zero. Thus in steady state Ramp3off is identical to Ramp1 other than that it is time shifted from Ramp1 by ⅔*T Sec. Illustrated at 520 is a sample waveform for Ramp3off. Since comparator 525 is using the same COMP (item 510) signal and compares it with Ramp3off and generates Phi3, in steady state when capacitor C2 voltage is regulated, Phi3 resembles Phi1 (that is, high and low durations match that of Phi1) and it is just a time shifted version of Phi1 shifted in time from Phi1 by ⅔*T Sec.

If the voltage across the capacitor C2 goes out of regulation, for example, is lower than the required voltage of ⅓*VIN, then the output 512 of the proportional gain block 509 is non zero and goes higher, thus causing the Ramp3off to go higher, this makes the output of the comparator 525 to go low sooner as Ramp3off crosses COMP voltage sooner, thus reducing the time during which Phi3 is high. If the high time of Phi3 is decreased, as the capacitor C2 is discharged when Phi3 is high (as shown in the table of FIG. 4B), the amount of discharge of capacitor C2 is decreased compared to the charge build up in C2 (as seen from table in FIG. 4B, C2 is charged when Phi2 is high and since high time of Phi3 is now decreased compared to Phi2 and since C2 is charged and discharged with inductor L current which is constant ignoring the small current ripple). Thus the voltage stored in C2 keeps building up until it reaches the steady state value of ⅓*VIN. Similarly opposite action takes place when C2 has a higher voltage than ⅓*VIN until it reaches the steady state regulated value of ⅓*VIN. Thus the voltage across C2 is regulated by making the pulse Phi3 shorter or longer compared to Phi1 as the Ramp3off crosses Comp node faster or slower than Ramp1 based on the voltage at the node 512. Thus, the capacitor voltage regulation is done in this example by modulating the trailing (falling) edge of the duty cycle signal Phi3 and is illustrated with an example waveform 532 wherein Phi3 always goes high at ⅔*T Sec later than Phi1 (example at 5/3*T Sec and 8/3*T Sec compared to T Sec and 2T Sec for Phi1 as illustrated in 533) but the trailing (falling) edge is modulated, as shown by the arrowed lines, based on the offset voltage at 512.

Block 529 takes the control signals Phi1, Phi2, and Phi3 as inputs and level shifts and buffers these signals to appropriate levels to drive the switches in the DAC 530. In addition interface block 529 can include additional logic to generate complementary signals to Phi1, Phi2, and Phi3 to drive the complimentary switches in the DAC 530. In addition, interface block 529 can inched the non-overlapping logic to drive the complimentary switches in the DAC 530. Additionally, it can have leading edge blanking inputs Blank, Blank2 and Blank3. As shown in the example waveform 533, Phi1 goes high at T Sec as Ramp1 515 is starting from a lower value than Comp voltage. When Phi1 goes high, low side switch (example S1B in FIG. 4) is turned OFF and the high side switch (example S1 in FIG. 4) is turned ON. As the Ramp1 signal can include sensed current signal (as an example, proportional to the current flowing through the switch S1 in FIG. 4), turning on the high side switch can inject noise into the Ramp1 signal causing false termination (i.e. Phi1 incorrectly going low immediately after going high). To avoid this false termination, Blank signal, which is periodic and also goes high at the same time as Phi1 going high (example at T Sec, 2*T Sec etc) and stays high for a small duration long enough to avoid the noise from high side switch turning on, sets a latch present in the interface block 529 to high state. This latch is reset to low state only when Phi1 goes low but when Blank is not high, thus preventing the false low side transition of Phi1 to turn off high side switch as Blank signal is still high during this time. Similarly, Phi2 and Phi3 signals can have corresponding blanking signals Blank2 (which goes high whenever Phi2 goes high, i.e. at 4/3*T Sec, 7/3*T Sec etc) and Blank3 (which goes high whenever Phi3 goes high, i.e. at 5/3*T Sec, 8/3*T Sec etc).

Thus in the control loop 500, the regulation of the capacitor voltages and the output voltage VOUT is achieved by modulating the trailing (falling) edge (i.e. the edge which turns off the corresponding switch connected between VIN and SW terminal of the DAC) of the corresponding duty cycle signals. Therefore the present invention regulation scheme regulates the voltages on the DAC capacitors as well in addition to the regulation of the output voltage VOUT.

FIG. 6A illustrates, generally at 600, various time durations with an example waveform for control inputs Phi1, Phi2, and Phi3 for a 3-bit DAC (for example 530 of FIG. 5). Since it is a three bit DAC, the control signals are shifted in time by ⅓*T Sec (Seconds), where T is the time period of one switching cycle, from the previous signal with Phi1 going high at T Sec (as shown at 601A), Phi2 going high ⅓*T Sec later at 4/3*T Sec (as shown at 602A), Phi3 going high ⅓*T Sec later at 5/3*T Sec (as shown at 603A) and this cycle repeating again with Phi1 going high at 2*T Sec (as shown at 604A). SW output of the DAC switches between two voltages, one charging the inductor L (for example, inductor L in FIG. 5) current and the other discharging the inductor current. Time duration during which inductor current $I_{IND}$ is ramping up when Phi1 is high, around its DC value $IDC_{IND}$, is d1, duration following d1 during which inductor current is ramping down is d1$b$, duration during which inductor current is ramping up when Phi2 is high is d2, duration following d2 during which inductor current is ramping down is d2$b$, duration during which inductor current is ramping up when Phi3 is high is d3 and the duration following d3 during which inductor current is ramping down is d3$b$.

Since for output regulation the average inductor current $IDC_{IND}$ must equal the load current at the output, there is no net change in the inductor current in one clock period i.e. in T Sec (Seconds) interval. Therefore the sum of inductor ramp up currents during the intervals d1, d2 and d3 must equal to the inductor ramp down currents during the intervals d1$b$, d2$b$ and d3$b$. Using this condition, it can be shown that the conversion ratio VOUT/VIN for the 3-bit DAC based step-down converter (example FIG. 2A, 400, FIG. 5) is proportional to v1*d1+v2*d2+v3*d3, wherein v1 is the voltage at SW node during the interval d1, v2 is the voltage at SW node during the interval d2 and v3 is the voltage at SW node during the interval d3. In steady state when the DAC capacitor voltages are regulated, the SW output voltage is symmetrical in a clock, therefore for the 3-bit DAC the voltage output at SW is approximately equal in value during the intervals d1, d2 and d3 (and similarly, during inductor discharge intervals d1$b$, d2$b$ and d3$b$). Therefore, the above equation for the conversion ratio can be simplified as VOUT/VIN is proportional to d1+d2+d3. Even though in the example waveforms in FIG. 6A only one control signal from Phi1, Phi2, and Phi3 is high at a time; the above equations are still valid even when more than one control signal is high at a time. When only one control signal is high at a time, intervals d1, d2 and d3 match the duty cycle durations of the control signals Phi1, Phi2, and Phi3 but when these control signals overlap, d1,d2 and d3 represent the time durations during which inductor current is ramping up (as an example in FIG. 2B, d1 represents only a fraction of time during which DAC1 is high and corresponds to the time duration during which inductor current is ramping up by $\Delta I_{IND205B}$ within the time during which DAC1 is high). Similarly, the conversion ratio VOUT/VIN for an N-bit DAC step-down converter is proportional to v1*d1+v2*d2+ . . . +vn*dn and when in steady state with DAC capacitors regulated, voltages v1, v2 . . . vn are almost equal and conversion ratio VOUT/VIN is proportional to d1+d2+ . . . +dn.

Therefore, for example, in the control loop 500 of FIG. 5, in order to regulate the capacitor voltage C1, if Phi2 is slightly made shorter, by moving the trailing (falling) edge closer to the leading (rising) edge, the time duration d2 in FIG. 6A is reduced. If for example the capacitor C2 is regulated then there is no change in the duration d3. Therefore using the equation d1+d2+d3 for conversion ratio VOUT/VIN, for regulated output voltage VOUT, if d2 is decreased in time by $\Delta T$, then time duration d1 must be increased by the same duration $\Delta T$ such that d1+d2+d3 is constant for constant output voltage VOUT for a given input supply voltage VIN.

Figures 7A, 7B, 7C, 7D, 7E:
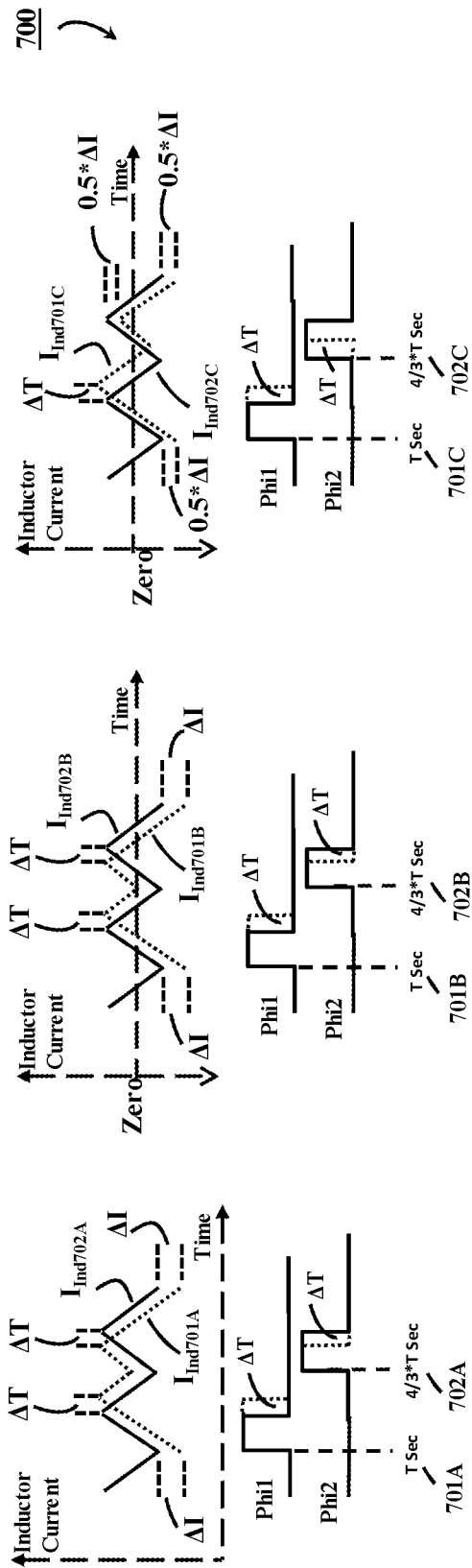
FIGS. 7A, 7B, 7C, 7D, 7E, and 7F illustrate example waveforms for inductor current variation when DAC control signals are modulated per different techniques.

FIG. 7A shows, generally at 700, an example waveform for the control loop 500 in FIG. 5 wherein the voltage across the capacitor C1 is slightly less than the required value of ⅔*VIN, causing the output 511 to be positive and hence decreasing the high duration of Phi2 (duration d2 in FIG. 6A) by $\Delta T$ as shown by the dotted trailing edge in the Phi2 waveform in FIG. 7A. If the capacitor C2 (FIG. 5) is in regulation, then the time duration of Phi3 is unchanged but the high time duration of Phi1 is increased by $\Delta T$ (as shown) to keep the output voltage VOUT in regulation. Leading (rising) edges of Phi1 and Phi2 remain unchanged with Phi1 going high at T Sec (Seconds) as shown at 701A and Phi2 going high ⅓*T Sec later at 4/3*T Sec as shown at 702A. $I_{Ind702A}$ shows the inductor current before the Phi2 duration is decreased and $I_{Ind701A}$ (dotted waveform) shows the inductor current waveform after Phi2 high duration is decreased. In this example the load current (which is equal to inductor DC current for a step-down converter) is larger than the inductor switching frequency ripple current. Therefore the inductor currents as shown in $I_{Ind701A}$ and $I_{Ind702A}$ remain positive and never go negative even including the switching frequency ripple. Since Phi2 goes lower earlier by $\Delta T$ for regulating the capacitor C1 voltage, the inductor current starts discharging earlier by $\Delta T$ (as shown with $I_{Ind701A}$ starting to decrease before $I_{Ind702A}$ at the new trailing edge of the Phi2 [shown with dotted edge]). Since the leading edge (of Phi3) remains unchanged, the effective inductor discharge time, following Phi2 high time, is increased by $\Delta T$ causing a net decrease in inductor valley current by $\Delta I$ (as shown with $I_{Ind701A}$ going lower by $\Delta I$ compared to $I_{Ind702A}$ after Phi2 goes lower). If the capacitor C2 is in regulation, the net change in inductor current is zero (for example, the amount of inductor current increase during interval d3 in FIG. 6A is equal to the amount of inductor current decrease during the interval d3$b$) and therefore during the next cycle when Phi1 goes high again, inductor current starts at a value lower by $\Delta I$ (as shown with $I_{Ind701A}$ starting lower by $\Delta I$ compared to $I_{Ind702A}$ at the raising edge of Phi1). Even though the inductor starts at a lower current, since the Phi1 high duration is increased by the same amount ΔT, inductor charges to the same peak value (as shown with $I_{Ind701A}$ reaching the same peak value compared to $I_{Ind702A}$ but ΔT later). Since C1 is charged during high duration of Phi1 (as shown in the table of FIG. 4B) and it is discharged during high duration of Phi2 and since high duration of Phi1 is increased by ΔT (increasing the C1 charge time) and high duration of Phi2 is decreased by ΔT (decreasing the C1 discharge time), there is an effective net accumulation of charge in C1 and thus brings voltage across C1 (which was initially lower than the required value in this example) into regulation.

FIG. 7B illustrates the scenario for the above example, wherein the Phi1 high duration is increased by ΔT and high duration of Phi2 is decreased by ΔT for regulating the voltage across the capacitor C1, which is lower than the required value as above, by changing the trailing (falling) edges as shown in the Phi1 and Phi2 waveforms with dotted lines but with leading (rising) edges remaining unchanged with Phi1 going high at T Sec (Seconds) 701B and Phi2 going high ⅓*T Sec later at 4/3*T Sec 702B as before. But here in this example, the load current and hence the inductor current has decreased and is lower than the inductor switching frequency ripple current. $I_{Ind702B}$ in FIG. 7B illustrates the inductor current before the ΔT change in the durations of Phi1 and Phi2 signals and $I_{Ind701B}$ illustrates the inductor current after the ΔT correction. As can been seen in these inductor current waveforms, the inductor current is now bidirectional i.e. both positive and negative as the load is lower than the inductor switching current ripple. When the inductor current is positive, as explained above, C1 is charging when Phi1 is high and it is discharging when Phi12 is high, however when the inductor current is bidirectional, C1 is charging when Phi1 is high but only during the duration when the inductor current is positive but is discharging when the inductor current is negative. Similarly, when Phi2 is high, C1 is only discharging when inductor current is positive but is charging when the inductor current is negative. Since Phi2 goes lower earlier by ΔT for regulating the capacitor C1 voltage, the inductor current starts discharging earlier by ΔT (as shown with $I_{Ind701B}$ starting to decrease before $I_{Ind702B}$ at the new trailing edge of the Phi2 [shown with dotted edge]). Since the leading edge (of Phi3) remains unchanged, the effective inductor discharge time, following Phi2 high time, is increased by ΔT causing a net decrease in inductor valley current by ΔI (as shown with $I_{Ind701B}$ going lower by ΔI compared to $I_{Ind702B}$ after Phi2 goes lower) and therefore net increase in inductor negative current is ΔI. If the capacitor C2 is in regulation, the net change in inductor current is zero (for example, the amount of inductor current increase during interval d3 in FIG. 6A is equal to the amount of inductor current decrease during the interval d3b) and therefore during the next cycle when Phi1 goes high again, inductor current starts at a value lower by ΔI (as shown with $I_{Ind701B}$ starting lower by ΔI compared to $I_{Ind702B}$ at the raising edge of Phi1) and since this current is negative, the discharge current of C1 at the start of Phi1 going high is increased by ΔI. Even though the inductor starts at a lower current, since the Phi1 high duration is increased by the same amount ΔT, inductor charges to the same peak value (as shown with $I_{Ind701B}$ reaching the same peak value compared to $I_{Ind702B}$ but ΔT later). Even though the Phi1 high duration is extended by ΔT, there is a net decrease equal to ΔI*ΔT in capacitor C1 charge during the Phi1 high duration (compared to before the ΔT change) because the inductor current stays negative longer by ΔT (since it starts lower by ΔI when Phi1 goes high) and since negative inductor current during Phi1 high duration discharges C1, C1 is discharged longer by ΔT time. Similarly, because the Phi1 high duration is extended by ΔT and since the Phi2 leading edge is unchanged and goes high at 4/3*T Sec, inductor current $I_{Ind701B}$ has a smaller discharge time, reduced by ΔT, compared to $I_{Ind702B}$ and therefore when Phi2 goes high, the inductor current $I_{Ind701B}$ starts higher by the same amount ΔI. Therefore, even though the Phi2 high duration is decreased by ΔT, since the inductor current starts higher by ΔI, there is an effective decrease in the charging of capacitor C1 during the Phi2 high duration as the negative inductor current flow duration (which charges C1 during this time) is decreased by ΔT. The net decrease in C1 charging during Phi2 high duration is equal to ΔI*ΔT. Therefore capacitor C1 charge in one switching cycle is decreased by an amount equal to ΔI*ΔT (increased discharge during Phi1 high duration)+ΔI*ΔT (decreased charge during Phi2 high duration) i.e. 2*ΔI*ΔT compared to before the ΔT change in the Phi1 and Phi2 high durations. Thus when the inductor current is negative, decreasing the Phi2 time by ΔT by moving just the trailing edge to increase the capacitor C1 voltage actually decreases its voltage rather than increasing. Therefore, trailing edge modulation for regulating DAC capacitor voltages only works when the load is higher than the inductor switching ripple current and has the opposite effect when the load is reduced and inductor current becomes negative, causing the capacitor voltages to saturate (i.e. either reach positive rail or negative rail).

It is possible to detect the inductor current and operate the power supply in discontinuous conduction mode (DCM) and turn off the corresponding low side switches (example, S1B, S2B or S3B in FIG. 4) when the inductor current has become negative. However, inductor current detection, due to the speed and offsets inherently present, could be inaccurate causing negative inductor currents. An offset could be introduced in the inductor current detection to avoid negative currents but this will cause the premature turn off of the low side switch, decreasing the power supply efficiency.

Therefore an improved scheme for the regulation of the capacitor voltages is needed which would operate normally irrespective of the amount and direction of inductor current.

FIG. 7C shows the illustration wherein the high duration of Phi2 is reduced, by moving the leading (rising) edge of Phi2 to go high later than 4/3*T Sec by ΔT (as shown by dotted line 702C) to regulate the voltage of the capacitor C1 when it is lower than the required voltage. The leading edge of the Phi1 remains unchanged and goes high at T Sec 701C. As discussed with reference to FIGS. 7A and 7B, for proper output regulation the Phi1 high duration must increase by the same amount ΔT as shown by the dotted trailing edge in the Phi1 waveform. $I_{Ind702C}$ shows the inductor current waveform before the ΔT adjustment in Phi1 and Phi2 and $I_{Ind701C}$ shows the inductor current waveform after the adjustment. The reduction in the peak current of $I_{Ind701C}$ when Phi2 is high, which corresponds to a decreased discharge of the capacitor C1, can be calculated by the condition that average inductor current in one cycle must remain the same before and after the ΔT adjustment.

FIG. 6B shows an illustration to derive the equation for the inductor current when the Phi1 and Phi2 high times are adjusted for capacitor C1 voltage regulation. In the illustration of FIG. 6B, the high duration of Phi2 (which starts high at 602B 4/3*T Sec) is decreased by duration ΔT by moving trailing edge as shown by the dotted line. Assuming capacitor C2 is in regulation and hence Phi3 high duration remains unchanged, in order to keep output in regulation the high duration of Phi1 (which starts high at 601B T Sec) must then increase by the same amount ΔT and is shown by the dotted trailing edge in the Phi1 waveform. $I_{Ind602B}$ shows the inductor current waveform before the ΔT adjustment in Phi1 and Phi2 and $I_{Ind601B}$ shows the inductor current waveform after the adjustment. If the peak current during Phi2 high time is reduced by ΔX, as shown in FIG. 6B, and since the inductor current ramp down time is increased by ΔT (example in FIG. 6A, if d2 duration is decreased by ΔT by moving the trailing edge of Phi2, then d2b duration is increased by ΔT as Phi3 leading edge remains unchanged and goes high at 5/3*T Sec). If the inductor current ramps down by an additional amount ΔI during the time duration ΔT, then the inductor current $I_{Ind601B}$ after the adjustment goes negative sooner by time ΔT1 and goes lower by an extra amount ΔI+ΔX than the inductor current $I_{Ind602B}$ as shown. Because the inductor current is linear, during the Phi1 time when the current is ramping, the inductor current $I_{Ind601B}$ goes positive later than $I_{Ind602B}$ by the same duration ΔT1. Similarly, since the inductor ramp time (Phi1 high duration) is increased by ΔT and therefore in addition this causes the inductor ramp down time following Phi1 high time (example, duration d1b in FIG. 6A) to decreases by ΔT, inductor current $I_{Ind601B}$ goes negative later than $I_{Ind602B}$ by duration equal to ΔT2 as shown and since inductor current is linear and since inductor current $I_{Ind601B}$ hasn't gone as negative as $I_{Ind602B}$, when Phi2 goes high ramping up the inductor current, $I_{Ind601B}$ goes positive sooner by the same duration ΔT2 than $I_{Ind602B}$. Since the load current hasn't changed, then for output regulation the increase in duration during which inductor current is negative i.e. 2*ΔT1 must equal to reduction in duration during which inductor current is negative i.e. 2*ΔT2. Using this condition, one can derive the equation for ΔX, the reduction in peak inductor current when Phi2 is high, and is given by the equation ΔX=ΔI/ΔT*(Δd1b+Δd1−2*Δd2b)/2, wherein ΔI is the inductor current change in duration ΔT, Δd1b is the decrease in inductor ramp down duration d1b (example, duration d1b shown in FIG. 6A), Δd1 is the increase in inductor ramp time when Phi1 is high and Δd2b is the increase in inductor ramp down time d2b (example, duration d2b shown in FIG. 6A).

Using the equation ΔX=ΔI/ΔT*(Δd1b+Δd1−2*Δd2b)/2 for the example in FIG. 7C, where high duration of Phi2 is reduced by moving the leading edge of Phi2 by ΔT and Phi1 high duration increased by ΔT by moving the trailing edge and therefore Δd1=ΔT, Δd1b=0, Δd2b=0 and ΔX=0.5*ΔI. Therefore, as shown in FIG. 7C, the inductor current peak $I_{Ind701C}$ is lower than $I_{Ind702C}$ by 0.5*ΔI when Phi2 goes low. Since the inductor discharge time (example, d2b) remains unchanged, the inductor current $I_{Ind701C}$ is lower by the same amount 0.5*ΔI at the end of inductor ramp down time d2b and also when Phi1 goes high (assuming capacitor C2 is regulated causing inductor current to ramp up and ramp down by the same amount during the durations d3 and d3b). Since Phi1 high time and inductor ramp up time is increased by ΔT, the inductor peak current goes higher by amount equal to (ΔI−0.5*ΔI)=0.5*ΔI. Since the inductor ramp down time (example d1b as shown in FIG. 6A) is unchanged, as both the trailing edge of Phi1 and leading edge of Phi2 are moved later by the same duration ΔT, the inductor current $I_{Ind701C}$ starts higher by the same amount 0.5*ΔI at the rising edge of Phi2 (since the ramp down time is same but since $I_{Ind701C}$ starts ramping down from 0.5*ΔI higher current). Since high duration of Phi2 and hence inductor $I_{Ind701C}$ ramp up duration is shorter by ΔT and since it starts from 0.5*ΔI higher current, its peak current at the end of Phi2 high time is (ΔI−0.5*ΔI)=0.5*ΔI lower than $I_{Ind702C}$ which is same as where it started and this cycle repeats. The net change in the capacitor C1 voltage with a ΔT decrease in the high duration of Phi2, by moving the leading edge is, −0.5*I*0.5T (as the current starts negative by 0.5*I when Phi1 goes high)+ 0.5*I*0.5T (as the current increases by 0.5*I at the end of Phi1 high duration)−0.5*I*0.5T (as the current starts higher by 0.51 when Phi2 goes high thus decreasing the negative charging current)+0.5*I*0.5T (as the discharge current is lower by 0.5*I when Phi2 goes low), i.e. equal to zero. Therefore, there is no net change in the capacitor voltage C1 in this example. However, in reality as discussed above, since the output conversion ratio is given by v1*d1+v2*d2+ v3*d3, and in this example capacitor C1 voltage is lower than required, v2 is therefore lower than v1. Thus, a ΔT change in d2 (Phi2 high time) will cause less than ΔT change in d1 (Phi1 high time) for a given output conversion ratio. Therefore, in reality, the increase in Phi1 high duration in FIG. 7C is less than ΔT and therefore inductor current discharge time following Phi1 high duration is longer, causing the inductor current to start lower when Phi2 goes high and thus decreasing the capacitor C1 discharge and increasing its voltage until it reaches the required voltage. Thus, by moving the leading edge of the control signal Phi2 and keeping the trailing edge fixed, capacitor voltage can be regulated.

Similarly FIGS. 7D and 7E illustrate two more methods of regulating the capacitor voltages; in one method both the edges of Phi2 are modulated in opposite directions (for example, if leading/rising edge is delayed, then trailing/falling edge comes sooner or vice-versa) (FIG. 7D) and in the other method, there is no or smaller change in high duration of the Phi2 pulse but the pulse is shifted in time (i.e. both rising edge and falling edge of Phi2 move in same direction, i.e. if rising edge is delayed, then the falling edge is delayed as well) (FIG. 7E). Therefore, in the example of FIG. 7D, Phi1 goes high at T Sec (Seconds) at 701D and Phi2 goes high ⅓*T Sec later at 4/3*T Sec at 702D and inductor current is illustrated by $I_{Ind702D}$ and to regulate the capacitor C1 voltage, the high duration of the Phi2 is decreased by moving both the leading and trailing edges by ΔT, as illustrated by the dotted edges. Since the high duration of Phi2 is decreased by 2*ΔT, the high duration of Phi1 must increase by same amount to keep the output conversion constant. Therefore, high duration of Phi1 is increased by 2*ΔT as illustrated by the dotted trailing edge of Phi1. The above equation ΔX=ΔI/ΔT*(Δd1b+Δd1− 2*Δd2b)/2 can be used to find the inductor current after the change and is illustrated by the dotted line $I_{Ind701D}$. When Phi1 goes high, the inductor starts at a value 1.5*ΔI lower than before change in duty cycles and since Phi1 high duration is increased by 2*ΔT, it goes higher by 2*ΔI− 1.5*ΔI i.e. 0.51 when Phi1 goes low. Therefore there is a net increase in discharge of capacitor C1 voltage during Phi1 high duration proportional to (1.5*ΔI−0.5*ΔI)*ΔT=ΔI*ΔT. As the inductor current starts at 0.51 higher when Phi1 goes low and since inductor discharge time before Phi2 goes high is decreased by ΔT, inductor current starts at a value higher by 1.5*ΔI when Phi2 goes high, and since Phi2 high duration is shorter by 2*ΔT, the peak inductor current when Phi2 goes low is lower by 0.5*ΔI. Therefore, the net increase in C1 discharge when Phi2 is high is proportional to (1.5*ΔI− 0.5*ΔI)=ΔI*ΔT. Therefore, combining this with the net increase in C1 discharge when Phi1 was high, the total increase in capacitor C1 discharge voltage in one clock cycle is proportional to 2*ΔI*ΔT, thus further decreasing the capacitor C1 voltage further which was lower to start with. Therefore, modulating both the edges of the pulse Phi2 for regulating the capacitor voltage in opposite direction in this example does not achieve the required results and the capacitor voltage will saturate to either positive rail or negative rail.

Similarly, in the example illustration of FIG. 7E, there is no or a smaller change in high duration of the pulse but the pulse is shifted in time by $\Delta T$ for regulating the capacitor voltage. Therefore, in the example of FIG. 7E, Phi1 goes high at T Sec (Seconds) at 701E and Phi2 goes high $1/3*T$ Sec later at $4/3*T$Sec at 702E and inductor current is illustrated by $I_{Ind702E}$ before the duty cycle shift and to regulate the capacitor C1 voltage, the high duration of the Phi2 is kept constant by moving both the leading and trailing edges both later by $\Delta T$, as illustrated by the dotted edges. The equation $\Delta X=\Delta I/\Delta T*(\Delta d1b+\Delta d1-2*\Delta d2b)/2$ can be used to find the inductor current after the change and is illustrated by the dotted line $I_{Ind701E}$. When Phi1 goes high, the inductor starts at a value $0.5*\Delta I$ higher (thus decreasing the capacitor C1 negative discharge current by $0.5*\Delta I$) and since Phi1 high duration is unchanged, the current remains higher by 0.51 when Phi1 goes low (thus increasing the capacitor C1 charge current by $0.5*\Delta I$). Therefore, there is a net increase in capacitor C1 voltage during Phi1 high duration proportional to $(0.5*\Delta I+0.5*\Delta I)*\Delta T=\Delta I*\Delta T$. As the inductor current starts at $0.5*I$ higher when Phi1 goes low and since inductor discharge time before Phi2 goes high is increased by $\Delta T$, inductor current starts at a value lower by $0.5*\Delta I$ when Phi2 goes high (increasing the negative current which charges capacitor C1 by $0.5*\Delta I$), and since Phi2 high duration remains unchanged, the peak inductor current when Phi2 goes low remains lower by $0.5*\Delta I$ (thus, decreasing the positive current which discharges capacitor C1 by $0.5*\Delta I$). Therefore, the net decrease in C1 discharge when Phi2 is high is proportional to $(0.5*\Delta I+0.5*\Delta I)=\Delta I*\Delta T$. Therefore, combining this with the net increase in C1 voltage when Phi1 was high, the total increase in capacitor C1 charge voltage in one clock cycle is proportional to $2*\Delta I*\Delta T$, thus increasing the capacitor C1 voltage which was lower to start with and thus eventually bringing this voltage into regulation. Therefore, shifting the pulse Phi2 for regulating the capacitor voltage in this example achieves the required results and regulates the capacitor voltages properly.

The results from the examples of FIGS. 7B-7E are summarized in the table shown in FIG. 6C. Thus, as discussed above and can be see from the table in FIG. 6C, modulating the trailing edge or modulating both the edges in opposite directions cannot regulate the capacitor voltages in the DAC in the above examples but modulating just the leading edge or time shifting the duty cycle pulse (or modulating both the edges in the same direction) results in proper regulation.

For the sake of simplicity in explanation in the examples of FIGS. 7B-7E, it was assumed that the second capacitor C2 is regulated and the inductor current ramp up during Phi3 high duration is same as inductor current ramp down during Phi3 low duration before Phi1 goes high (for example the duration d3b in FIG. 6A). For example, in FIG. 7C, inductor current $I_{Ind702C}$ starts lower by $0.5*\Delta I$ when Phi3 goes high (as it has ramped down lower by $0.5*\Delta I$ after Phi2 went low). Since the current during Phi3 high duration discharges capacitor C2 and since it is starting from a lower value, the effective capacitor C2 discharge current is decreased, causing its voltage to build up every cycle. Thus an adjustment needs to be made to the Phi3 duration as well when Phi2 duration is adjusted to regulate the capacitor C1 voltage.

Figure 7F:
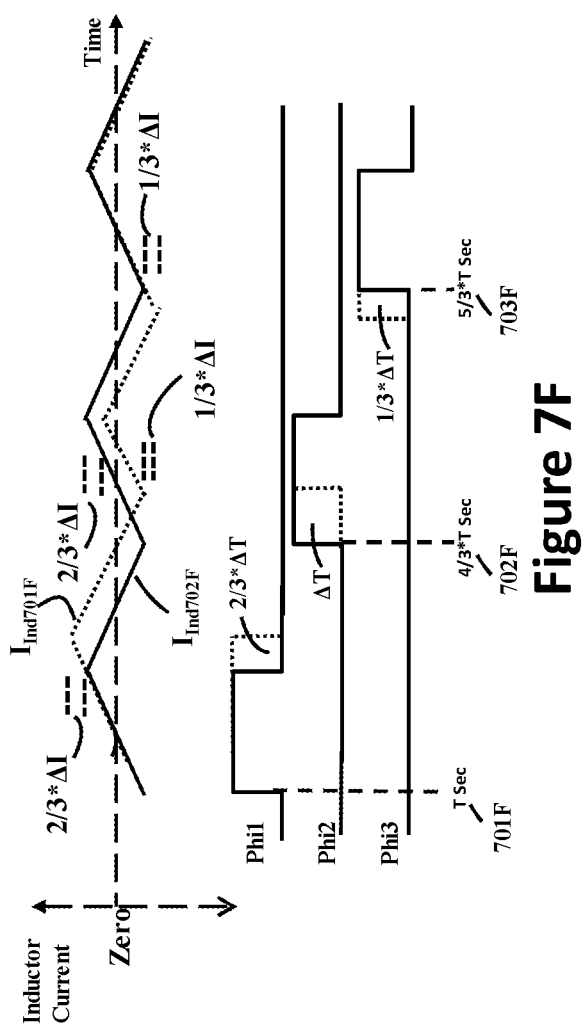

This is illustrated in the FIG. 7F. FIG. 7F illustrates the example wherein the capacitor C1 voltage is lower and to regulate the capacitor voltage, the high duration of Phi2 is reduced by moving the leading edge by $\Delta T$ as shown by the dotted leading edge in Phi2 waveform. Since the duty cycle of Phi2 is decreased by $\Delta T$, the sum of the duty cycles Phi1 and Phi3 must be increased by the same amount. It can be shown that when Phi1 high duration is increased by $2/3*\Delta T$ and Phi3 high duration is increased by $1/3*\Delta T$, output regulation and all the capacitor voltage regulations are achieved. In the FIG. 7F, Phi1 goes high at T Sec (Seconds) at 701F, Phi2 goes high $1/3*T$ Sec later at $4/3*T$ Sec at 702F and Phi3 goes high $1/3*T$ Sec later at $5/3*T$ Sec at 703F before the duty cycle changes and inductor current is illustrated by $I_{Ind702F}$ before the change. Phi1 high duration is increased by $2/3*T$ Sec by moving the trailing edge as shown with the dotted line, this increases the inductor current ramp time by $2/3*T$ Sec and therefore inductor current peak, when Phi1 goes low, increases by $2/3*\Delta I$ (where $\Delta I$ is the change in inductor current in time $\Delta T$) as illustrated by $I_{Ind701F}$. This increases the capacitor C1 voltage by an amount proportional to $2/3*\Delta T$ when Phi1 is high. Inductor current ramp down time is increased by $(\Delta T-2/3*\Delta T)=1/3*\Delta T$ before Phi2 goes high. Thus inductor current $I_{Ind701F}$ starts higher by an amount equal to $(2/3*\Delta I-1/3*\Delta I)=1/3*\Delta I$ when Phi2 goes high, but since the Phi2 high duration is shorter by $\Delta T$, inductor peak current when Phi2 goes low is $(\Delta I-1/3*\Delta I)=2/3*\Delta I$ lower than before the duty cycle change. Therefore, during the Phi2 high duration the net decrease in capacitor C1 discharge (also equal to net decrease in capacitor C2 charge, since capacitor C2 is also charged when Phi2 is high with the same current) is proportional to decrease in the time duration of positive current flow minus the time duration of negative current flow i.e. $(2/3*\Delta T-1/3*\Delta T)=1/3*\Delta T$. Similarly, since the leading edge of Phi3 is moved closer to Phi2 by $1/3*\Delta T$, the inductor current ramp down time duration before Phi3 goes high is therefore decreased by $1/3*\Delta T$, thus the inductor current starts lower by $1/3*\Delta I$ when Phi3 goes high rather than $2/3*\Delta I$. As this inductor current is negative and negative inductor current during Phi3 high duration charges the capacitor C2, the net increase in capacitor C2 charge during Phi3 high duration is proportional to time duration increase in Phi3 i.e. $1/3*\Delta T$. Adding up all the changes, the net capacitor C1 voltage increase in clock cycle is therefore proportional to $2/3*\Delta T$ increase during Phi1 high duration+ $1/3*\Delta T$ during Phi2 high duration i.e. proportional to $\Delta T$. Similarly, the net change in capacitor C2 voltage is $-1/3*\Delta T$ (decrease during Phi2 high duration)+$1/3*\Delta T$ (increase during Phi3 high duration) i.e. equal to zero. Thus, decreasing the Phi2 high duration by moving the leading edge of Phi2 to increase capacitor C1 voltage works properly increasing the capacitor C1 charge every cycle until it comes into regulation. The capacitor C2 voltage regulation loop will adjust the Phi3 high duration by moving its leading edge by $1/3*\Delta T$ so that capacitor C2 voltage doesn't change and remains in regulation when capacitor C1 voltage is being brought into regulation.

FIG. 7F illustrates the examples of capacitor voltage regulation by moving only the leading edges of Phi2 and Phi3. Similarly, it can be shown that by time shifting the pulse or moving both edges in the same direction (example 7E), the capacitor voltage regulation can be achieved. As with the example illustration of FIG. 7B, capacitor voltage regulation is not possible when only the trailing edge is moved to regulate the capacitor voltage when the inductor current is negative.

Even though, in the example illustrations of FIGS. 7B-7F, there is no overlap shown in the high duration of control signals Phi1, Phi2 etc., the above principles equally apply to the cases where there is overlap in the high duration of the control signals and in general they can be of any duty cycles. In addition, the order of the control signals is not important and as an example Phi2 control signal can follow later than Phi3 rather than preceeding it.

Similarly, even though in the above examples capacitor C1 voltage is used for explanation, without limitation the above principles can be equally applied to other additional capacitors in the DAC and similarly the DAC could consist of N control bits wherein N can be any natural number greater than 1.

Figure 8:
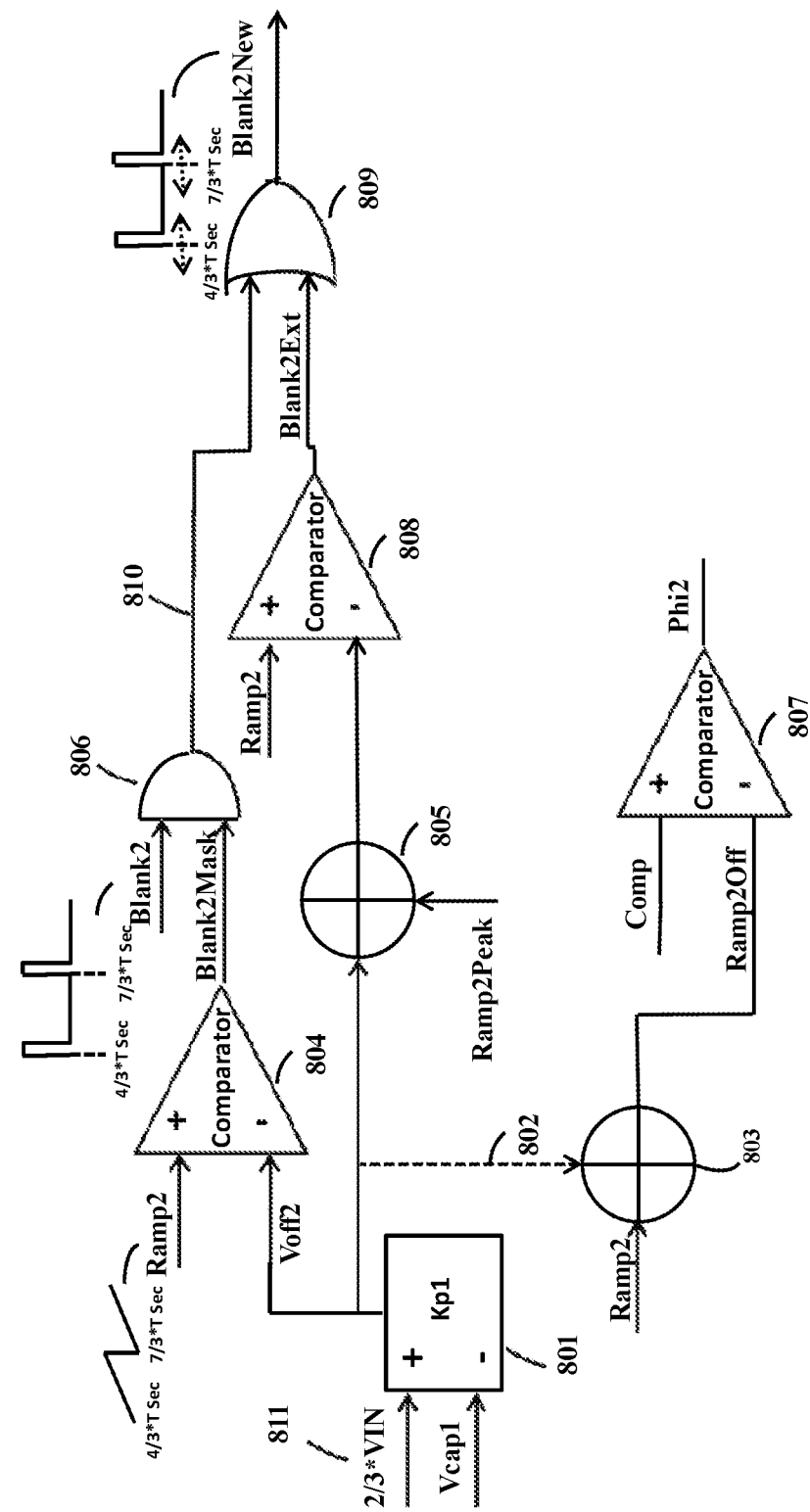
FIG. 8 illustrates an example apparatus for implementing leading edge modulation for capacitor voltage regulation as per the present invention.

Since as discussed above, regulating the capacitor voltages in the DAC by just moving the falling (trailing) edge of the control signals is not possible, changes can be made to the control loop 500 of FIG. 5 to achieve proper regulation under more conditions. FIG. 8, generally at 800, shows the modification needed in generating a Blank2New signal, which replaces the Blank2 signal shown in FIG. 5, which will cause the leading (rising) edge modulation of the control signal for regulating the capacitor C1 (FIG. 5). Capacitor C1 voltage, VCap1, is compared with the required voltage (in this example two-thirds the input voltage i.e. ⅔*VIN at 811) by the proportional gain block 801 with gain Kp1 (wherein the gain Kp1 can be less than unity) and its output Voff2 is proportional to the difference between the required and actual capacitor voltages and is positive if the capacitor voltage is less than the required value and is negative if the capacitor voltage is more than the required voltage. Voff2 signal is compared (in Comparator 804) with the time shifted ramp signal Ramp2 (in this example it is shifted in time by ⅓*T Sec [Seconds] and starting to go high at 4/3*T Sec, 7/3*T Sec etc., as shown in the sample Ramp2 waveform and is the signal 513 of FIG. 5). As explained with reference to FIG. 5, Blank2 goes high at 4/3*T Sec, 7/3*T Sec etc and stays high for a small fraction of the clock cycle. If Voff2 is positive, the comparator 804 output Blank2Mask is low as Voff2 is higher than Ramp2 which is starting from a low/zero value and stays low until Ramp2, which is ramping up, becomes higher than Voff2 and thus making Blank2Mask high. For simplicity, the gate 806 is represented as an AND gate, however in functionality, its output 810 is low when Blank2Mask is low and when Blank2Mask is high its output is same as Blank2. In addition, if Blank2Mask is low while Blank2 is high but Blank2Mask goes high after Blanks2 is low, then the output 810 goes high for a short duration when Blank2Mask goes high. Therefore, every clock cycle, when the Voff2 is positive, the output of the gate 806 stays low until Blank2Mask becomes high and which in turn delays Blank2New (as explained later, Blank2Ext input to the OR gate 809 is zero when Voff2 is positive) to go high later every clock cycle. Since Blank2New (which now replaces Blank2 in FIG. 5 which sets a latch in the interface block 529) is used to set a latch which turns on the high side transistor which causes inductor current to start ramp up (i.e. the leading edge of the duty cycle), the leading edge is delayed when Voff2 is positive i.e. capacitor voltage is less than the required value, lesser the capacitor value, more the delay and shorter will be the control pulse which turns ON the corresponding high side switch in the switched capacitor array DAC 530. As explained above, when the pulse is made shorter by modulating the leading edge, there is net accumulation of voltage across capacitor, thus increasing the capacitor voltage eventually and bringing it into regulation. Similarly, if the capacitor C1 voltage is higher than the required voltage, Voff1 is negative and the output of the adder 805 becomes lower than the peak value of Ramp2 (shown as Ramp2Peak input to the adder 805). Therefore the output of the comparator 808 Blank2Ext becomes high every clock cycle as Ramp2 crosses the voltage at the output of the adder and stays high until Ramp2 voltage resets and goes low at the start of next clock cycle i.e at the time intervals 4/3*T Sec, 7/3*T Sec etc (at these time intervals Blank2 also goes high). Thus the output of the OR gate 809 is high in this case when Blank2Ext is high or when Blank2 is high. Since Blank2Ext is high (when Voff2 is negative) preceeding Blank2 going high, the Blank2New goes high before Blank2 goes high and therefore the duty cycle control signal is of longer duration, keeping the corresponding high side switch in the switched capacitor array DAC 530 turning on longer and the duration is extended by making the signal go high sooner i.e. by modulating the leading edge. As explained above, increasing the pulse width by modulating the leading edge will result in net decrease in capacitor voltage thus bringing the voltage into regulation. When the capacitor voltage is in regulation or less than the required value, Voff2 to be positive and the output of the adder 805 will be higher than the peak value of Ramp2 (Ramp2peak) and therefore the output of the comparator 808 Blank2Ext will stay low as Ramp2 will never be able to reach a value higher than its peak and Blank2New in this case is controlled by the output of the AND gate 806 as explained above.

Thus the above implementation explains without limitation one method of modulating the leading edge for capacitor voltage regulation. Since the capacitor voltage regulation can be achieved by modulating the trailing edge in addition to the leading edge, the trailing edge could be modulated similar to the control loop of FIG. 5 and is shown also in FIG. 8, wherein the output Voff2 in FIG. 8 (511 in FIG. 5) of the proportional gain block Kp1, shown as dotted line 802 is added to the time shifted ramp signal Ramp2in FIG. 8 (513 in FIG. 5) with the adder 803 (537 in FIG. 5) and the output of the adder Ramp2off is compared to the error amplifier (507 in FIG. 5) output Comp with the comparator 807 (524 in FIG. 5) to generate the Phi2 signal which is used to reset the latch in the interface block 529 which causes the corresponding duty cycle signal to go low. If the Voff2 signals is subtracted from Ramp2 signal, then the trailing edge will move in the same direction of the leading edge i.e. the modulation scheme is time shifted pulse wherein the pulse is shifted in time but the pulse width remains less changed (example 7E).

Similar modifications, as illustrated in FIG. 8 for capacitor C1 voltage regulation as compared to the control loop 500 in FIG. 5, would be required for regulating the voltage of the capacitor C2 of FIG. 5 as well. Similarly, if the DAC has additional control bits with additional capacitors, this could be extended to them as well.

Figure 9A:
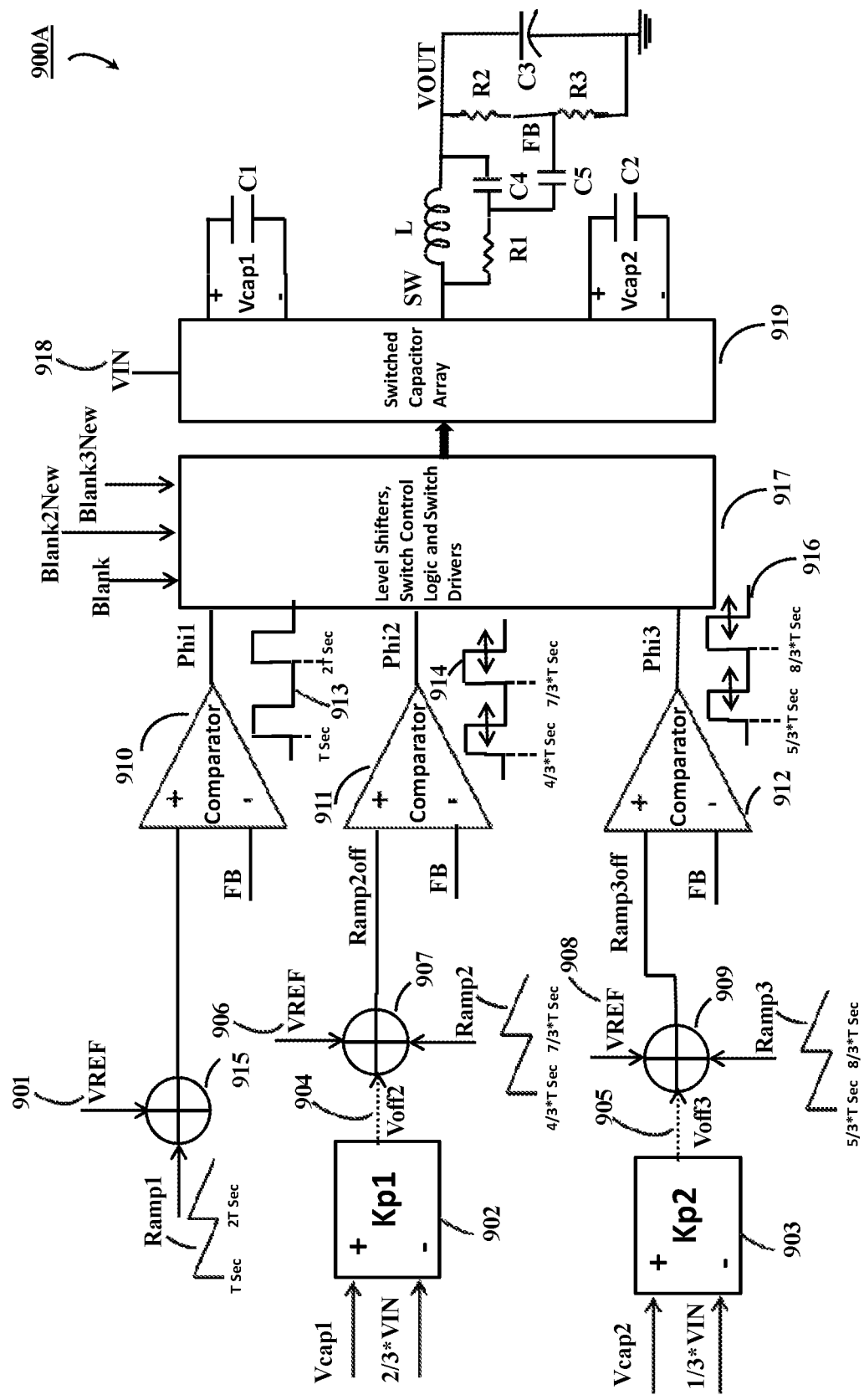
FIG. 9A illustrates one embodiment of generation of control signals based on hysteretic control for driving the switches in the switched capacitor array of the present invention.

FIGS. 5 and 8 illustrate the control loop for pulse width modulation (PWM) scheme for output voltage and the switched capacitor array DAC capacitor voltage regulation. Without limitation, the modulation methods for switched capacitor array voltage regulation can be extended to other control schemes. FIG. 9A illustrates, generally at 900A, without limitation, an example implementation of a control loop for hysteretic control of the output voltage for a step-down converter with input voltage VIN 918 and the output voltage VOUT. R2 and R3 form a resistor divider network at the output with the voltage FB used for output voltage sensing. Similar to FIG. 5, capacitors C1 and C2 are the two capacitors of the 3-bit DAC implemented as a switched capacitor array DAC 919 (similar to example 401 in FIG. 4) with signals Phi1, Phi2, and Phi3 controlling ON and OFF states of the switches in the switched capacitor array DAC 919 similar to the operation described with reference to control loop 500 above and C3 is the storage capacitor at the output. Output SW of the switched capacitor array DAC 919 is connected to the output VOUT through the inductor L. Components R1, C4 and C5 are optional compensation components which inject a ripple voltage onto the node FB wherein this ripple can be made to emulate the inductor L ripple current.

Comparator 910 controls and regulates the voltage at the node VOUT by sensing the voltage at the node FB and comparing it to the reference voltage VREF (item 901) (addition of the Ramp1 signal is explained below). If the voltage at FB is lower than VREF, then the comparator 910 output Phi1 is high, which causes corresponding high side switch in the DAC 919 to turn on (for example, switch S1 in item 401 of FIG. 4), causing the current in the inductor L and therefore the output voltage VOUT to increase and bring it into regulation. Similarly, when the FB voltage is higher than VREF, comparator 910 output Phi1 is low, which turns OFF the corresponding high side switch and turns ON the complimentary low side switch (for example, switch S1 is OFF and S1B is ON in the switched capacitor array 401 in FIG. 4), causing the current in the inductor L and the voltage VOUT to decrease and bring it into regulation. Ramp1 is a small magnitude periodic ramp signal with a period of T Sec (Seconds), which starts high at T Sec and ramps down low as shown by item Ramp1 waveform in FIG. 9A in a periodic fashion and this small ramp signal is added by the adder (item 915) to the reference signal VREF and this combined signal (output of the item 915) is compared to the FB signal by the comparator 910. As the Ramp1 starts high at T Sec, the positive input of the comparator 910 starts higher than FB causing the comparator 910 output Phi1 to go high at T Sec (waveform in item 913) and as Ramp1 slopes down and thus the combined output of the adder 915 comes down and reaches FB voltage, the output of comparator 910 Phi1 becomes low. The addition of this small periodic ramp signal Ramp1 to the reference signal VREF makes the hysteretic control loop 900A to be periodic. Ramp2 and Ramp3 signals are similar to Ramp1 signals but are shifted in time by ⅓*T Sec and ⅔*T Sec from the Ramp1 signal and these signals are added (respectively at 907 and 909) to VREF (respectively 906 and 908) and the combined signals Ram2off and Ramp3off are compared to FB signal by the comparators 911 and 912 generating outputs Phi2 and Phi3 (illustrated by items 914 and 916 respectively) which are similar to Phi1 but are shifted in time from it by ⅓*T Sec and ⅔*T Sec respectively. Similar to the control loop 500, these signals control the turning ON and turning OFF of the corresponding switches they control in the switched capacitor array 919.

Similar to the item 529 in FIG. 5, the interface block 917 takes the control signals Phi1, Phi2, and Phi3 as inputs and level shifts and buffers these signals to appropriate levels to drive the switches in the switched capacitor array DAC 919. In addition, interface block 917 can include additional logic to generate complementary signals to Phi1, Phi2, and Phi3 to drive the complimentary switches in the DAC 919. In addition, interface block 917 can inched the non-overlapping logic to drive the complimentary switches in the DAC 919. Additionally, it can have leading edge blanking inputs Blank, Blank2New and Blank3New, the function of these signals are similar the ones in the control loop 500.

Figure 9B:
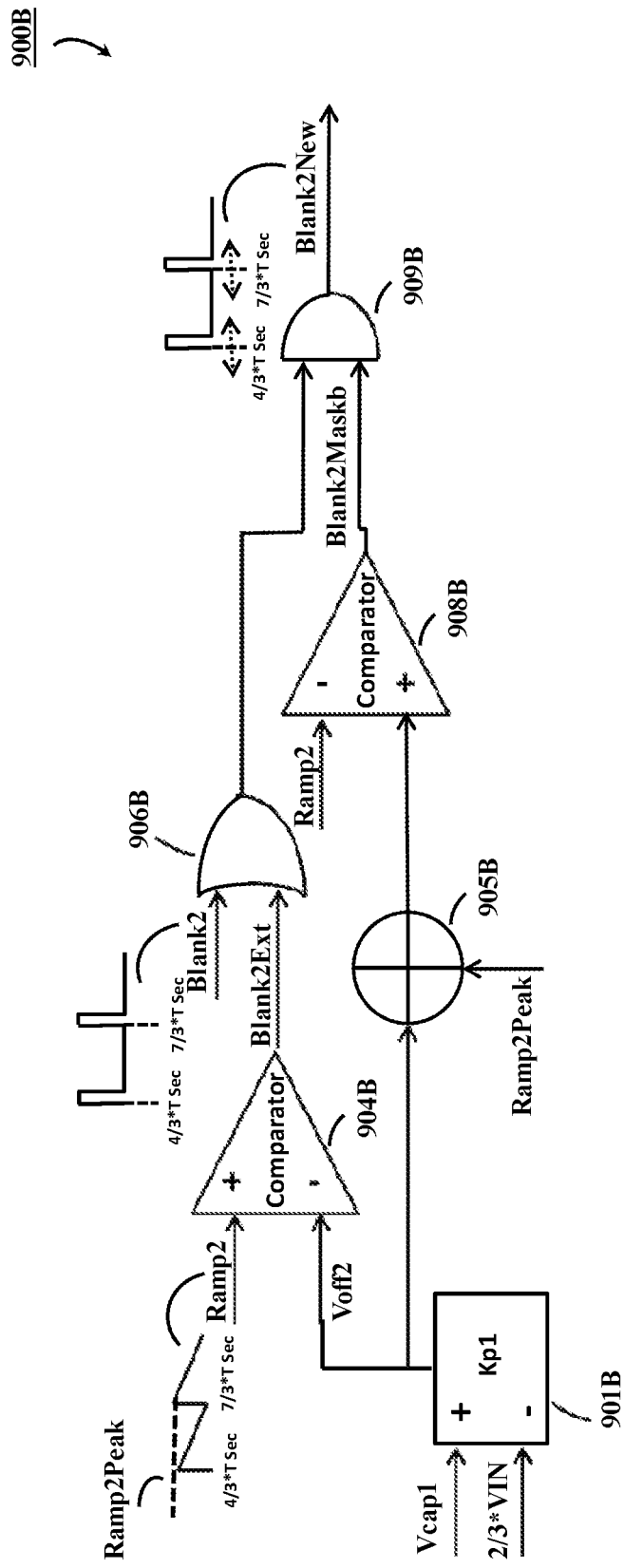
FIG. 9B illustrates an example apparatus for implementing leading edge modulation for capacitor voltage regulation as per the present invention.

Voltages on capacitors C1 and C2 of the hysteretic control loop 900A can be regulated similarly to that of control loop 500. Similar to FIG. 8, FIG. 9B shows, generally at 900B, the modification needed in generating Blank2New signal for use in FIG. 9A, which will cause the leading (rising) edge modulation of the control signal for regulating the capacitor C1 in hysteretic control loop 900A of FIG. 9A. Capacitor C1 voltage, Vcap1 (from FIG. 9A) in FIG. 9B, is compared with the required voltage (in this example two-thirds the input voltage i.e. ⅔*VIN) by the proportional gain block 901B with gain Kp1 (wherein the gain Kp1 can be less than unity) and its output Voff2 is proportional to the difference between the required and actual capacitor voltages and is positive if the capacitor voltage is less than the required value and is negative if the capacitor voltage is more than the required voltage. Voff2 signal is compared (904B) with the time shifted ramp signal Ramp2 (in this example it is shifted in time by ⅓*T Sec [Seconds] and starting to ramp down at 4/3*T Sec, 7/3*T Sec etc., as shown in the sample Ramp2 waveform in FIG. 9B). As explained with reference to FIG. 5, Blank2 goes high at 4/3*T Sec, 7/3*TSec etc. and stays high for a small fraction of the clock cycle. If Voff2 is positive, the comparator 904B output Blank2Ext goes high every clock when Ramp2 ramps down below Voff2, for example slightly before 4/3*T Sec, 7/3*T Sec etc., where Ramp2 is lowest in magnitude and stays high until 4/3*T Sec, 7/3*T Sec etc. at which time Ramp2 is reset and goes high. The output of the OR gate 906B is high when Blank2Ext is high or when Blank2 is high. Since Blank2 input to the OR gate 906B is going high at 4/3*T Sec, 7/3*T Sec etc. and since Blank2Ext goes high slightly before 4/3*T Sec, 7/3*T Sec etc., and output of the OR gate 906B and hence the output of the AND gate 909B (other input of the AND gate 909B, Blank2Maskb will be HIGH when Voff2 is positive as explained below) Blank2New goes high before Blank2 goes high. As explained above with reference to the control loop 500, Blank2New is used to turn on the switch corresponding to the signal Phi2 in the switched capacitor array DAC 919 (i.e. for example switch S2 in FIG. 4), and since turning on switch S2 sooner will keep it ON longer, thus discharging the capacitor C1 (for example as shown in Table 4) and making Vcap1 lower and bringing it equal to ⅔*VIN and thus making Voff2 zero which in turn makes Blank2Ext stay low thus preventing the Blank2New to go high sooner and thus capacitor C1 voltage is regulated.

Similarly, when the capacitor C1 voltage, Vcap1, is less than the required value, Voff2 is negative and the adder 905B, adds this negative value to Ramp2peak (which is the peak value of Ramp2 as illustrated in the example Ramp2 waveform) and thus the output of the adder 905B (which is also the input of the positive terminal of the comparator 908B) will be lower than the peak value of Ramp2peak (i.e. the peak value of Ramp2). Therefore the output of the comparator 908B, Blank2Maskb, will be low every clock cycle starting at 4/3*T Sec, 7/3*T Sec etc. as Ramp2 (negative input of the comparator 908B) starts at Ramp2peak (peak value of Ramp2) every clock cycle at 4/3*T sec, 7/3*T Sec and is therefore higher than the positive input of the comparator 908B. When Blank2Maskb is low, the output of the AND gate 909B Blank2New is low at the start of every clock cycle at 4/3*T Sec, 7/3*T Sec etc. Blank2New stays low until Ramp2 ramps down and decreases below Ramp2Peak+Voff2 (wherein Voff2 is negative in this example). As explained above, since Blank2New going high, turns ON the switch S2 in the switched capacitor array 919, delaying the rising edge of Blank2New will delay, turning ON switch S2, thus causing decreased discharge of the capacitor C1 and therefore increasing its voltage and bringing it into regulation. Once it is in regulation, its voltage Vcap1 will become equal to ⅔*VIN and the output of the proportional gain block 901B, Voff2, will become zero and therefore the output of the comparator 908B will now stay high causing the Blank2New signal to be same as Blank2.

Thus as explained above, capacitor C1 regulation is achieved by modulating the rising edge of the pulse which turns ON the switch S2 (high side switch, i.e. the switch connected between VIN and SW) in the switched capacitor array. Thus the above implementation explains without limitation one method of modulating the leading edge for capacitor voltage regulation. Since the capacitor voltage regulation can be achieved by modulating the trailing edge in addition to the leading edge, the trailing edge could be modulated similar to the control loop of FIG. 5 and is shown also in FIG. 9A, wherein the output Voff2 (which also corresponds to Voff2 in FIG. 9B) in FIG. 9A of the proportional gain block 902 (gain Kp1), shown as dotted line 904 is added to the time shifted ramp signal Ramp2 in FIG. 9A with the adder 907 and the output of the adder Ramp2off is compared to output feedback signal FB with the comparator 911 to generate the Phi2 signal and when Ramp2off falls below FB signal value, then Phi2 signal goes low turning off the corresponding high side switch S2 in the switched capacitor array 919. If the Voff2 is subtracted from the Ramp2 signal, then the modulation scheme is dual edge modulation (example 7D) wherein both the edges move in opposite directions. Similarly, if the Voff2 signal is added to the Ramp2 signal, then the trailing edge will move in the same direction of the leading edge i.e. the modulation scheme is time shifted pulse wherein pulse is shifted in time but pulse width remains less changed (example 7E).

Similar functioning as illustrated in FIG. 9B for capacitor C1 of FIG. 9A voltage regulation would be required for regulating the voltage of the capacitor C2, Vcap2, to the required voltage (for example as shown to ⅓*VIN). The functioning of the comparator 912, proportional gain block 903 (gain Kp2) and the adder 909 are similar to the comparator 911, proportional gain block 902 and the adder 907. Ramp3 signal is similar to Ramp2 signal except that it is time shifted by ⅓*T Sec from Ramp2 signal. Voff3 signal (dashed line at 905) output of the block 903 has similar function to that of Voff2 and is zero when the capacitor C2 voltage is regulated to the required voltage of ⅓*VIN. Similar to Phi2 signal, which generates a control signal for the corresponding switch S2 and its complementary switch S2B in the switched capacitor array 919, the signal Phi3 controls the corresponding switch S3 and its complementary switch S3B in the switched capacitor array 919 (as example shown in FIG. 4). As the comparators 911 and 912 use the output voltage feedback signal FB as one of the inputs, similar to comparator 910, they regulate the output voltage as well.

Thus, FIGS. 9A and 9B illustrate regulation of the voltage on the capacitors in the switched capacitor array in a hysteretic control loop. Although, explanations have been made using sloping down ramp signals (for example, Ramp1 starting at peak value at T Sec, 2T Sec etc. and reducing in magnitude in time), the principle explained above can be applied to up-slope ramps, dual slope ramps, etc.

The principles of the invention are explained above with reference to a step-down converter. For example, in FIG. 5, the switched capacitor array 530 is connected between input voltage VIN and ground similar to the switched capacitor array 401 in FIG. 4, with inductor L connected between the terminals SW and VOUT. If the VIN and VOUT terminals in FIG. 5 are swapped, then the switched capacitor array will be connected between VOUT and ground as in the step-up converter of FIG. 4C with inductor L now connected between the terminals SW and VIN. While the signals Phi1, Phi2, and Phi3 in the step-down converter in FIG. 5 correspond to time shifted duty signals and when they are high turn ON corresponding high side switches (i.e. switches connected between VIN and SW terminals, for example when Phi1 is high, switch S1 is ON in FIG. 4) and turn OFF corresponding low side switches (i.e. switches connected between SW and ground terminals, for example when Phi1 is high, switch S1B is OFF in FIG. 4), if the control loop in FIG. 5 is connected as a step-up converter, then the signals Phi1, Phi2, and Phi3 will still be duty cycle signals, however, now when they are high, turn ON corresponding low side switches (i.e. switches connected between SW and GND terminals, for example when Phi1 is high, switch S1 is ON in FIG. 4C) and turn OFF corresponding high side switches (i.e. switches connected between VOUT and SW terminals, for example when Phi1 is high, switch S1B is OFF in FIG. 4C). While the capacitors C1 and C2 are regulated by comparing their voltages Vcap1 and Vcap2 respectively to ⅔*VIN and ⅓*VIN (as illustrated by items 503 and 505 in FIG. 5 and to ⅔*VIN item 811 in FIG. 8) in a step-down conversion, they will be regulated to ⅔*VOUT and ⅓*VOUT instead in a step-up operation by replacing items 503 and 811 to ⅔*VOUT and item 505 to ⅓*VOUT.

In addition, the switched capacitor array and the leading edge modulation for capacitor voltage regulation of the present invention can be extended to include bidirectional converters. This is illustrated in FIG. 10, generally at 1000.

Figure 10:
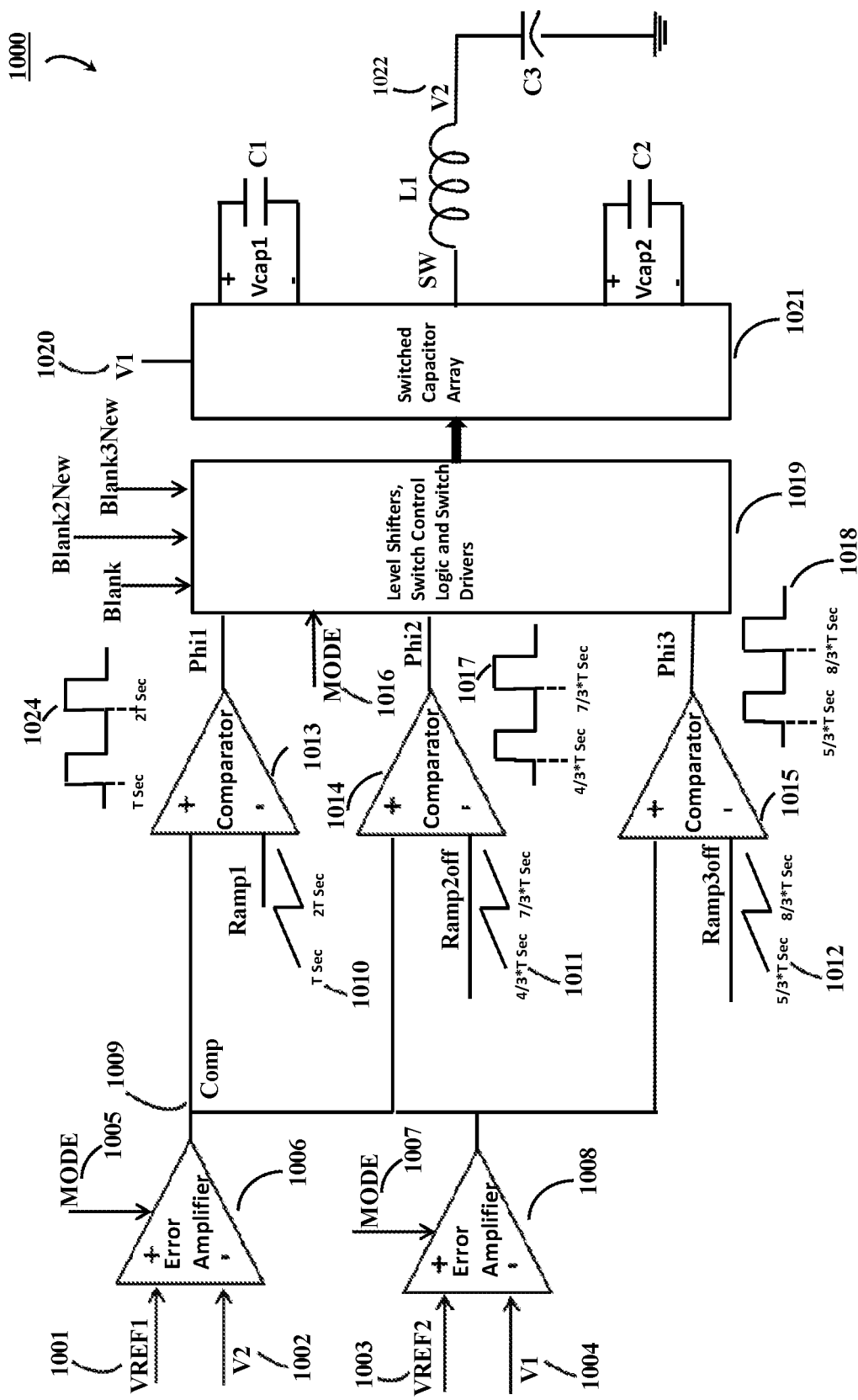
FIG. 10 illustrates one embodiment of a bidirectional converter as per the present invention.

Operation of the bidirectional power supply in FIG. 10 is similar that of power supply 500 illustrated in FIG. 5. Similar to the comparators 523, 524, and 525 which compare Ramp1, Ramp2off, and Ram3off to Comp voltage and generate Phi1, Phi2, and Phi3 respectively, similar comparators 1013, 1014, and 1015 compare Comp voltage (1009) to Ramp1 (1010), Ramp2off (1011), and Ramp3off (1012) respectively and generate duty signals Phi1, Phi2, and Phi3 respectively which control the switches in the switched capacitor array 1021. Similar to the power supply of FIG. 5, Phi2, and Phi3 are offset from Phi1 by ⅓*T Sec and ⅔*T Sec respectively as shown by items 1024, 1017, 1018 for the sample waveforms for Phi1, Phi2, and Phi3 respectively.

MODE control signal (as shown by items 1005, 1007, 1016) controls whether the power supply 1000 is a step-down converter or a step-up converter. As an example, if MODE is set LOW, it could select step-down operation and when it is set HIGH could select step-up operation. When step-down operation is selected, V1 (item 1020) becomes the input (similar to VIN in FIG. 5) and V2 (item 1022) becomes the output of the power supply (similar to VOUT in FIG. 5) and the current flow will be from V1 to V2 and inductor L current will flow to the output V2 (similar direction to $I_{IND}$ in FIG. 5). However, if step-up operation is selected, then V1 (item 1020) will be the output and V2 (item 1022) will be the input of the power supply (similar to the step-up converter 400C) and the current flow will be from V2 to V1 and the inductor L current will flow in opposite direction to that of the step-down mode i.e. from V2 into the inductor.

When step-down mode is selected, error amplifier 1006 is enabled by the MODE control bit (item 1005) and this error amplifier output controls the COMP net (1009), whereas the MODE control bit (item 1007) going into the error amplifier 1008 makes this error amplifier output be high impedance (tri-state), thus preventing it to control the COMP net in step-down mode. Error amplifier 1006 controls COMP net by comparing reference voltage VREF1 (item 1001) and the voltage V2 (item 1022 at C3) by either sensing directly or through a feedback network at its other input (item 1002). As explained above, V2 is the output voltage in the step-down operation. Thus the operation of the error amplifier 1006 in this mode is similar to that of the error amplifier 507 in FIG. 5 where reference voltage VREF is compared to the output voltage VOUT in generating COMP voltage. Similarly, when step-up mode is selected, error amplifier 1006 output is put in tri-state by the MODE control input (item 1005) and now the COMP voltage is controlled by the error amplifier 1008. In this case, error amplifier compares a reference voltage VREF2 (1003) to the voltage V1 (item 1020 at switched capacitor array 1021) by either directly sensing it or through a feedbacknetwork at its other input (item 1004). Since V1 is the output voltage in the step-up mode, thus again COMP voltage is controlled based on comparing a reference voltage to the output voltage and thus regulating output voltage.

The leading edge (rising edge) modulation signal inputs Blank2New and Blank3New in FIG. 10 are generated similar to the generation of Blank2New signal in FIG. 8 and as explained above with reference to the power supply 500. In FIG. 8, capacitor voltage Vcap1 is compared to a fraction of the input voltage ⅔*VIN (item 811). For the bidirectional power supply of FIG. 10, this needs to be replaced with ⅔*V1, where V1 (1020) is the input voltage in the step-down conversion and is the output voltage in the step-up conversion. Confirming with the standard terminology, the leading edge modulation signals vary the time where the switch that causes inductor current to increase (and thus causing output voltage to increase) turns ON i.e. when the selected mode is step-down, the leading edge modulation will vary the turn ON time of the corresponding high side switch (i.e. the switch connected between V1 and SW terminals) and similarly when the mode selected is step-up conversion, then the leading edge modulation will vary the turn ON time of the corresponding low side switch (i.e. the switch connected between SW and ground terminals). In addition, the trailing edge can be modulated similar to the power supply in FIG. 5, by adding the components 508, 509, 513, and 514 to affect the Ramp2off and Ramp3off signals respectively in FIG. 10 and with item 503 modified from ⅔*VIN to ⅔*V1 and item 505 modified from ⅓*Vin to ⅓*V1 since V1 is the input voltage in step-down mode and is the output voltage in step-up mode and as the capacitors need to be regulated to a fraction of the input voltage in step-down mode and a fraction of the output voltage in step-up mode.

The function of the interface block 1019 is similar to that of the block 529 in FIG. 5. Interface block 1019 takes the switch capacitor control signals Phi1, Phi2, and Phi3 as inputs and level shifts them, buffers them to drive their corresponding switches in the switched capacitor array 1021. Furthermore, it generates the complementary signals for the Phi1, Phi2, and Phi3 signals, to control the complementary switches in the switched capacitor array 1021. Furthermore, it can include non-overlap logic to prevent simultaneous turning ON of complementary switches together (for example, simultaneous turning ON of complementary switches S1 and S1B in FIG. 4). In addition, it takes the step-up or step-down conversion control bit MODE as input (item 1016). When the MODE bit selects step-down mode, then the signals Phi1, Phi2, and Phi3 control the high side switches (i.e. the switches connected between the terminals V1 and SW) and when these signals are high, then the corresponding high side switch is ON and when they become low, then the corresponding high side switch is OFF and the corresponding low side switch turns ON (for example, when Phi1 is high, S1 is ON and S1B is OFF and when Phi1 becomes low, S1 is OFF and S1B is ON in FIG. 4). On the other hand, when the MODE bit selects step-up operation, then the interface block 1019 reverses the operation such that the signals Phi1, Phi2 and Phi3 control the low side switches (i.e. the switches connected between the terminals SW and ground) and when these signals are high, then the corresponding low side switch turns ON and when they become low, then the corresponding low side switch is OFF and the corresponding high side switch turns ON (for example, when Phi1 is high, S1 is ON and SIB is OFF and when Phi1 becomes low, S1 is OFF and SIB is ON in FIG. 4C).

Although the operation of the bidirectional converter was explained above with two error amplifiers 1006 and 1008, it is possible to use just one error amplifier instead and multiplex its inputs based on step-down or step-up operation, i.e. selecting VREF1 and V2 as its inputs in step-down operation and selecting VREF2 and V1 as its inputs in step-up operation.

While not germane to the operation or techniques disclosed, one of skill in the art will appreciate that the device types of devices, for example, switches as shown at S1, S2, S3, S1B, S2B, S3B, etc. in FIG. 4, FIG. 9A, FIG. 9B, FIG. 10, FIG. 11, FIG. 12, and in any figure showing switches, can be operated using different polarities and can be fabricated in different technology types, for example, but not limited to, CMOS (complementary metal oxide semiconductor (MOS)) devices, Bipolar devices, DMOS (double diffused MOS) devices, NMOS (n-type MOS), PMOS (p-type MOS) devices, etc. Additionally, the power systems of the present invention can be implemented in CMOS, BiCMOS (bipolar CMOS), BCD (BiCMOS and Bipolar, CMOS and DMOS), GaAs (gallium arsenide), GaN (Gallium nitride) SOI (silicon on insulator), or other processes. In addition, these devices for the clarity of explanation of the invention are shown to be step-down buck type and step-up boost type and synchronous (switches for both high side and low side devices) switchers. Without limitation, the present invention can be applied to additional switcher types, for example non-synchronous switchers (wherein some of the switches could be replaced by diodes, Schottky diodes etc.), buck-boost switchers (wherein the switched capacitor array could be used on one or both sides of the inductor), half bridge (as an example, the switched capacitor array is coupled to the primary side of the transformer and the secondary side is coupled to the output with additional components like rectification diodes, etc.), full bridge, inverting power supply, etc. In addition, the magnetic component could be inductors, transformers, etc. and the input power source could also be AC (alternating current) rather than a DC (direct current) source.

In addition, the control loops shown in FIG. 5, FIG. 9A, FIG. 10 are illustrated for the clarity of explanation with a pulse width modulation and hysteretic control schemes to generate switch control signals and in addition capacitor voltage regulation signals controlling only Phi2 and Phi3. The principles disclosed could equally be applied to other control schemes like constant on time, constant off, etc. Further, one capacitor voltage could control more than one signal, as an example capacitor C1 voltage in FIG. 5, FIG. 9A, and FIG. 10, etc. could control Phi3 signal in addition to the Phi2 signal. Further, the operation of the power supplies have been illustrated with a specific sequence in control signals, for example Phi1 is followed by Phi2 and is followed by Phi3. Any other sequence in the control signals could equally be implied for the power supplies of the present invention. Furthermore, the above principles could be applied to switched capacitor arrays consisting of any number capacitors ranging from 1 to N, where N is any natural number. In addition, the present invention has been explained with analog signals (for example, ramp signals, reference signals, etc. are analog). Without limitations, the principles of the present invention can be equally applied to digital control loops. Furthermore, in the control loop examples shown in FIG. 5, FIG. 9A, and FIG. 10, the control signals Phi2, and Phi3 which regulate switched capacitor voltages Vcap1 and Vcap2 (in addition to the output voltage VOUT), are leading edge modulated, the control signal Phi1 which is not controlling switched capacitor voltage but only controlling output voltage VOUT is trailing edge modulated. Without limitation, the control signal Phi1 can be leading edge modulated as well. Furthermore, the present invention has been explained with measuring the switched capacitor voltages and comparing them with required voltages (example, item 503 ⅔*VIN with item 504 Vcap1 in FIG. 5). Instead, indirect capacitor voltage regulation can be achieved by modulating the leading edge, for example, by keeping inductor valley current constant.

In addition, even though the high side and low side switches in the switched capacitor array are complementary in general (for example when switch S1 is ON in FIG. 4, switch S1B is OFF and vice versa), both the switches could be OFF simultaneously, for example to provide non-overlap operation or to prevent reverse inductor current synchronous switch could be turned OFF.

Thus a method and apparatus for control of switch mode power supplies utilizing inductive and capacitive conversion means have been described.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus while particular embodiments and applications of the present invention have been illustrated and described, it is to be understood that the invention is not limited to the precise construction and components disclosed herein. Various modifications, changes and variations which will be apparent may be made in the arrangement, operation and details of the method and apparatus of the present invention disclosed herein without departing from the spirit and scope of the invention as defined in the claims.

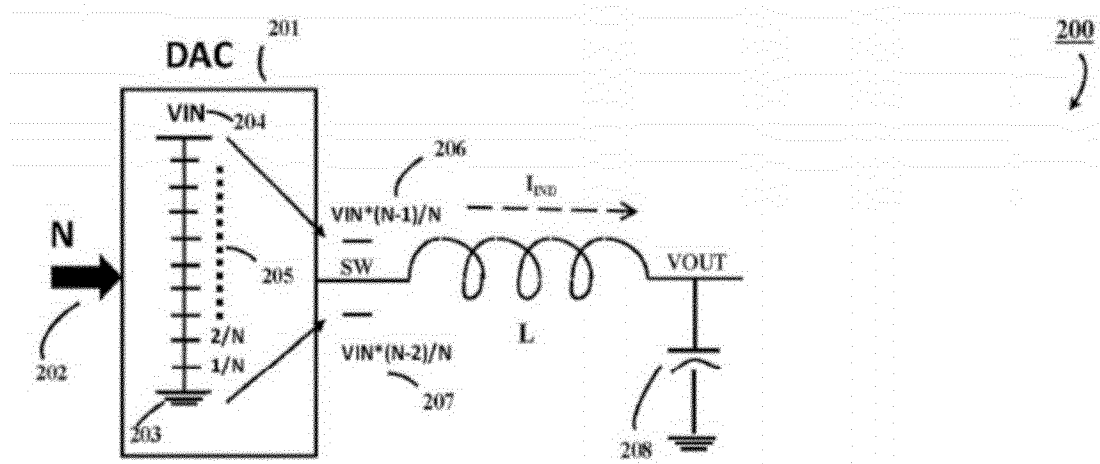

What is claimed is:

1. A power supply comprising:
   a switched capacitor array comprising of switches and capacitors;
   a first terminal of the switched capacitor array coupled to a first terminal of a magnetic storage element;
   wherein the capacitors in the switched capacitor array are charged and discharged with a current flowing through the magnetic storage element;
   wherein voltages on the capacitors in the switched capacitor array are regulated by changing a time duration of the current flowing through the capacitors in the switched capacitor array;
   wherein the time duration is changed repetitively in steady state of operation by changing a time position of a leading edge of a first signal which turns on a first switch in the switched capacitor array wherein the turning on of the first switch in the switched capacitor array causes current in the magnetic storage element to increase.

2. The power supply of claim 1 wherein the voltages on the capacitors in the switched capacitor array are sensed to change the time duration.

3. The power supply of claim 1 wherein the time duration is further changed by changing a time position of a trailing edge of the first signal such that the total change in time duration is minimized.

4. The power supply of claim 1 wherein the power supply output voltage is regulated by changing a time position of a trailing edge of a second signal which turns off a second switch in the switched capacitor array wherein the turning off of the second switch in the switched capacitor array causes current in the magnetic storage element to decrease; and
   wherein the time duration of the second signal is not directly changed for the regulation of the voltages on the capacitors in the switched capacitor array.

5. A step-down power supply comprising:
   a switched capacitor array comprising of switches and capacitors;
   a first terminal of the switched capacitor array coupled to a first terminal of a magnetic storage element;
   a second terminal of the switched capacitor array coupled to an input of the step-down power supply;
   a second terminal of the magnetic storage element coupled to an output of the step-down power supply;
   wherein the capacitors in the switched capacitor array are charged and discharged with a current flowing through the magnetic storage element;
   wherein voltages on the capacitors in the switched capacitor array are regulated by changing a time duration of a current flowing through the capacitors in the switched capacitor array;
   wherein the time duration is changed repetitively in steady state of operation by changing a time position of a leading edge of a first signal which turns on a first switch in the switched capacitor array wherein the turning on of the first switch in the switched capacitor array causes current in the magnetic storage element to increase.

6. A step-down power supply of claim 5 wherein the voltages on the capacitors in the switched capacitor array are a fraction of a voltage at the input of the step-down power supply.

7. The step-down power supply of claim 5 wherein the voltages on the capacitors in the switched capacitor array are sensed to change the time duration of the current flowing through the capacitors in the switched capacitor array.

8. The step-down power supply of claim 5 wherein the voltage at the output of the step-down power supply is regulated by changing a time position of a trailing edge of a second signal which turns off a second switch in the switched capacitor array wherein the turning off of the second switch in the switched capacitor array causes current in the magnetic storage element to decrease; and
wherein a time duration of the second signal is not directly changed for regulation of the voltages on the capacitors in the switched capacitor array.

9. A step-up power supply comprising:
a switched capacitor array comprising of switches and capacitors;
a first terminal of the switched capacitor array coupled to a first terminal of a magnetic storage element;
a second terminal of the switched capacitor array coupled to an output of the step-up power supply;
a second terminal of the magnetic storage element coupled to an input of the step-up power supply;
wherein the capacitors in the switched capacitor array are charged and discharged with a current flowing through the magnetic storage element;
wherein voltages on the capacitors in the switched capacitor array are regulated by changing a time duration of a current flowing through the capacitors in the switched capacitor array;
wherein the time duration is changed repetitively in steady state of operation by changing a time position of a leading edge of a first signal which turns on a first switch in the switched capacitor array wherein the turning on of the first switch in the switched capacitor array causes current in the magnetic storage element to increase.

10. The step-up power supply of claim 9 wherein the voltages on the capacitors in the switched capacitor array are regulated to voltages which are a fraction of the voltage at the output of the step-up power supply.

11. The step-up power supply of claim 9 wherein the voltages on the capacitors in the switched capacitor array are sensed to change the time duration.

12. The step-up power supply of claim 9 wherein the voltage at the output of the step-up power supply is regulated by changing a time position of a trailing edge of a second signal which turns off a second switch in the switched capacitor array wherein the turning off of the second switch in the switched capacitor array causes current in the magnetic storage element to decrease; and
wherein the time duration of the second signal is not directly changed for regulation of the voltages on the capacitors in the switched capacitor array.

13. A bidirectional power supply having a power supply output voltage, the bidirectional power supply comprising:
a switched capacitor array comprising of switches and capacitors;
a first terminal of the switched capacitor array coupled to a first terminal of a magnetic storage element;
wherein a control bit selects a direction of power conversion;
wherein the capacitors in the switched capacitor array are charged and discharged with a current flowing through the magnetic storage element;
wherein voltages on the capacitors in the switched capacitor array are regulated by changing a time duration of a current flowing through the capacitors in the switched capacitor array;
wherein the time duration is changed repetitively in steady state of operation by changing a time position of a leading edge of a first signal which turns on a first switch in the switched capacitor array wherein the turning on of the first switch in the switched capacitor array causes current in the magnetic storage element to increase.

14. The bidirectional power supply of claim 13 wherein the voltages on the capacitors in the switched capacitor array are a fraction of a voltage at a second terminal of the switched capacitor array wherein the second terminal of the switched capacitor array is an input of the bidirectional power supply when a step-down mode is selected or is an output of the bidirectional power supply when a step-up mode is selected.

15. The bidirectional power supply of claim 13 wherein a polarity of control signals controlling ON and OFF states of the switches in the switched capacitor array are reversed when a polarity of the control bit selecting the direction of power conversion is reversed.

* * * * *

UNITED STATES PATENT AND TRADEMARK OFFICE
CERTIFICATE OF CORRECTION

PATENT NO. : 10,727,738 B2
APPLICATION NO. : 16/104634
DATED : July 28, 2020
INVENTOR(S) : Sridhar V. Kotikalapoodi It is certified that error appears in the above-identified patent and that said Letters Patent is hereby corrected as shown below:

On the Title Page

Delete the title page and substitute therefore with the attached title page consisting of the corrected illustrative figure(s).

In the Claims

Claim 6, Line 62 (Column 28):
Change "6. A step-down" to --"6. The step-down--.

Signed and Sealed this
Twenty-fifth Day of August, 2020

Andrei Iancu
*Director of the United States Patent and Trademark Office*

(12) United States Patent
Kotikalapoodi

(10) Patent No.: US 10,727,738 B2
(45) Date of Patent: Jul. 28, 2020

(54) METHOD AND APPARATUS FOR CONTROL OF SWITCH MODE POWER SUPPLIES UTILIZING MAGNETIC AND CAPACITIVE CONVERSION MEANS

(71) Applicant: Sridhar V. Kotikalapoodi, Sunnyvale, CA (US)

(72) Inventor: Sridhar V. Kotikalapoodi, Sunnyvale, CA (US)

(*) Notice: Subject to any disclaimer, the term of this patent is extended or adjusted under 35 U.S.C. 154(b) by 0 days.

(21) Appl. No.: 16/104,634

(22) Filed: Aug. 17, 2018

(65) Prior Publication Data

US 2018/0367033 A1    Dec. 20, 2018

Related U.S. Application Data

(63) Continuation-in-part of application No. 14/693,746, filed on Apr. 22, 2015, now Pat. No. 10,084,384.

(51) Int. Cl.
*H02M 3/07* (2006.01)

(52) U.S. Cl.
CPC ........ *H02M 3/07* (2013.01); *H02M 2003/072* (2013.01)

(58) Field of Classification Search
CPC .... H02M 3/07–2003/078; G05F 3/205; G11C 5/145; H01L 27/0222
See application file for complete search history.

(56) References Cited

U.S. PATENT DOCUMENTS

| | | | | |
|---|---|---|---|---|
| 5,581,454 A | * | 12/1996 | Collins | H02M 3/07 363/59 |
| 6,184,741 B1 | * | 2/2001 | Ghilardelli | G11C 5/145 327/536 |
| 6,414,453 B1 | * | 7/2002 | Tamagawa | B60K 6/28 318/139 |
| 8,854,019 B1 | | 10/2014 | Levesque | |
| 10,069,408 B2 | * | 9/2018 | Abdulslam | H02M 3/07 |
| 2008/0158915 A1 | | 7/2008 | Williams | |
| 2009/0278520 A1 | | 11/2009 | Perreault | |
| 2015/0194878 A1 | * | 7/2015 | Hu | H02M 3/07 365/226 |
| 2016/0065058 A1 | * | 3/2016 | Van Kampen | B81B 7/008 327/536 |
| 2016/0352219 A1 | | 12/2016 | Amgad Abdulslam | |

* cited by examiner

*Primary Examiner* — Daniel Kessie
*Assistant Examiner* — Peter M Novak
(74) *Attorney, Agent, or Firm* — Heimlich Law, PC; Alan Heimlich, Esq.

(57) ABSTRACT

A Method and apparatus for control of switch mode power supplies utilizing magnetic and capacitive conversion means are disclosed. The switch mode power supply is efficient and generates very small inductor current ripple and output voltage ripple. The switch mode power supply has a wider bandwidth and the filter components including magnetic storage element and the output capacitor can be made much smaller. The capacitor voltages in the switched capacitor array are regulated by changing the amount of time the inductor current passes through them.

15 Claims, 15 Drawing Sheets